US012563394B2

(12) United States Patent
Rohini et al.

(10) Patent No.: US 12,563,394 B2
(45) Date of Patent: Feb. 24, 2026

(54) METHOD AND SYSTEM OF AUTHENTICATION AND AUTHORIZATION IN AN MSGin5G SERVER

(71) Applicant: Samsung Electronics Co., Ltd., Suwon-si (KR)

(72) Inventors: Rajendran Rohini, Bangalore (IN); Nivedya Parambath Sasi, Bangalore (IN); Rajavelsamy Rajadurai, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 217 days.

(21) Appl. No.: 18/271,595

(22) PCT Filed: Jan. 6, 2022

(86) PCT No.: PCT/KR2022/000230
§ 371 (c)(1),
(2) Date: Jul. 10, 2023

(87) PCT Pub. No.: WO2022/149874
PCT Pub. Date: Jul. 14, 2022

(65) Prior Publication Data
US 2024/0314561 A1 Sep. 19, 2024

(30) Foreign Application Priority Data

Jan. 8, 2021 (IN) .............................. 202141000979
Dec. 17, 2021 (IN) ............................. 2021 41000979

(51) Int. Cl.
*H04W 12/069* (2021.01)
*H04W 12/084* (2021.01)

(52) U.S. Cl.
CPC ....... *H04W 12/069* (2021.01); *H04W 12/084* (2021.01)

(58) Field of Classification Search
CPC . H04W 12/069; H04W 12/084; H04W 92/02; H04W 4/70; H04W 12/08; H04W 88/18
See application file for complete search history.

(56) References Cited

U.S. PATENT DOCUMENTS

2006/0149962 A1* 7/2006 Fountain ............... H04L 9/0897
713/151
2010/0290617 A1* 11/2010 Nath ...................... H04L 9/3236
380/29

(Continued)

OTHER PUBLICATIONS

Samsung, Resolving editor's note on using TLS based on AKMA PSK, S3-203248, 3GPP TSG-SA3 Meeting #101-e, e-meeting, Oct. 30, 2020.

(Continued)

*Primary Examiner* — J. Brant Murphy
(74) *Attorney, Agent, or Firm* — Jefferson IP Law, LLP

(57) ABSTRACT

The present disclosure relates to a pre-5th generation (5G) or 5G communication system to be provided for supporting higher data rates beyond 4th generation (4G) communication system such as long term evolution (LTE). Embodiments herein provide a method of authentication and authorization between a MSGin5G server and a MSGin5G client, the method comprising: receiving, by a MSGin5G interworking function, a pre-shared key request from one of a SEAL server and a MSGin5G Server; deriving, by the MSGin5G interworking function a pre-shared key $K_{MSG-PSK}$ in response to the pre-shared key request; sending, by the MSGin5G interworking function, the pre-shared key $K_{MSG-PSK}$ to one of the SEAL server and the MSGin5G Server; deriving, by a MSGin5G client, the pre-shared key upon receiving either before or after service provisioning procedure; and establishing a TLS session using the pre-shared key $K_{MSG-PSK}$ derived by the MSGin5 interworking function and the MSGin5G client.

14 Claims, 20 Drawing Sheets

(56) References Cited

U.S. PATENT DOCUMENTS

| | | | | |
|---|---|---|---|---|
| 2017/0230361 A1* | 8/2017 | Toth | ......................... | H04L 63/08 |
| 2020/0295933 A1* | 9/2020 | Link, II | .................. | H04W 4/70 |
| 2023/0164553 A1* | 5/2023 | Rajadurai | ......... | H04W 12/0431 |
| | | | | 726/4 |

OTHER PUBLICATIONS

China Mobile, 'Key issue on authentication and authorization between MSGin5G Gateway Client and MSGin5G server' S3-203139, 3GPP TSG-SA3 Meeting #101e, e-meeting, Oct. 30, 2020.

Samsung, 'Authentication and Authorization between 5GMSGS Client and MSGin5G server', S3-203239, 3GPP TSG-SA3 Meeting #101-e, e-meeting, Oct. 30, 2020.

Samsung, 'Authentication and Authorization between 5GMSGS Client and MSGin5G server using secondary authentication', S3-203240, 3GPP TSG-SA3 Meeting #101-e, e-meeting, Oct. 30, 2020.

3GPP TR 23.700-24 V17.1.0 (Jun. 2021) 3rd Generation Partnership Project; Technical Specification Group Services and System Aspects; Study on support of the 5G MSG (Message) Service (Release 17), Jun. 24, 2021.

3GPP TS 23.222 V18.1.0 (Mar. 2023) 3rd Generation Partnership Project; Technical Specification Group Services and System Aspects; Functional architecture and information flows to support Common API Framework for 3GPP Northbound APIs; Stage 2 (Release 18), Mar. 31, 2023.

3GPP TS 23.501 V18.1.0 (Mar. 2023) 3rd Generation Partnership Project; Technical Specification Group Services and System Aspects; System architecture for the 5G System (5GS); Stage 2 (Release 18), Apr. 5, 2023.

3GPP TS 23.041 V18.1.0 (Dec. 2022) 3rd Generation Partnership Project; Technical Specification Group Core Network and Terminals; Technical realization of Cell Broadcast Service (CBS) (Release 18), Jan. 2, 2023.

3GPP TS 33.434 V17.3.0 (Sep. 2022) 3rd Generation Partnership Project; Technical Specification Group Services and System Aspects; Security aspects of Service Enabler Architecture Layer (SEAL) for verticals; (Release 17), Sep. 22, 2022.

3GPP TS 23.502 V18.1.1 (Apr. 2023) 3rd Generation Partnership Project; Technical Specification Group Services and System Aspects; Procedures for the 5G System (5GS); Stage 2 (Release 18), Apr. 5, 2023.

3GPP TS 33.501 V18.1.0 (Mar. 2023) 3rd Generation Partnership Project; Technical Specification Group Services and System Aspects; Security architecture and procedures for 5G system (Release 18), Mar. 30, 2023.

3GPP TS 33.310 V18.0.0 (Mar. 2023) 3rd Generation Partnership Project; Technical Specification Group Services and System Aspects; Network Domain Security (NDS); Authentication Framework (AF) (Release 18), Mar. 30, 2023.

Indian Office Action dated Sep. 21, 2022, issued in an Indian Patent Application No. 202141000979.

Korean Office Action dated Jul. 1, 2025, issued in Korean Patent Application No. 10-2023-7023248.

Korean Office Action dated Nov. 12, 2024, issued in Korean Patent Application No. 10-2023-7023248.

Extended European Search Report dated May 8, 2024, issued in European Patent Application No. 22736851.1-1218.

3rd Generation Partnership Project; Technical Specification Group Services and System Aspects; Study on support of the 5GMSG Service; (Release 17), 3GPP Standard; Technical Report; 3GPP TR 23.700-24, 3rd Generation Partnership Project (3GPP), No. V1.2.0, XP051961754, Dec. 3, 2020.

3rd Generation Partnership Project; Technical Specification Group Services and System Aspects; Study on security aspects of the Message Service for MIoT over the 5G System (MSGin5G), 3GPP Standard; Technical Report; 3GPP TR 33.862, 3rd Generation Partnership Project(3GPP), No. VO.2.0, XP051961699, Nov. 20, 2020.

* cited by examiner

METHOD AND SYSTEM OF AUTHENTICATION AND AUTHORIZATION IN AN MSGin5G SERVER

CROSS-REFERENCE TO RELATED APPLICATION(S)

This application is a U.S. National Stage application under 35 U.S.C. § 371 of an International application number PCT/KR2022/000230, filed on Jan. 6, 2022, which is based on and claimed priority of an Indian Provisional Application number 202141000979, filed on Jan. 8, 2021, in the Indian Intellectual Property Office, and of an Indian Non-Provisional Application number 202141000979, filed on Dec. 17, 2021, in the Indian Intellectual Property Office the disclosure of each of which is incorporated by reference herein in its entirety.

TECHNICAL FIELD

The present disclosure relates to wireless communication systems, and more specifically to a method and a system for authentication and authorization in MSGin5G service.

BACKGROUND ART

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

$3^{rd}$ Generation Partnership Project (3GPP) has specified application architecture for MSGin5G service (defined in SA6 TS 23.554) based on the architecture principles.

A User Equipment (UE) is of three logical types depending on a type of underlying transport services supported, as follows, 5GMSGS UE, Legacy 3GPP UE, and Non-3GPP UE.

The 5GMSGS UE type supports a 5GMSGS client and supports one or more $3^{rd}$ Generation Partnership Project (3GPP) defined delivery mechanisms for sending and receiving MSGin5G message requests. All the 5GMSGS UEs that are in a broadcast area and support 3GPP broadcast message may receive broadcast message sent from the 5GMSGS UE or an application server.

The legacy 3GPP UE type does not support the 5GMSGS client, and support one or more 3GPP defined message delivery mechanism (e.g. Short Message Service (SMS), Non-IP Data Delivery (NIDD), etc). All the Legacy 3GPP UEs that are in a broadcast area and support a 3GPP broadcast message may receive broadcast message sent from the 5GMSGS UE or the application server.

The Non-3GPP UE type supports one of the non-3GPP message delivery mechanism (e.g. Rich Communication Service (RCS), Lightweight Machine-to-Machine (LwM2M)).

The 5GMSGS UE supports Service Enabler Architecture Layer for Verticals (SEAL) for MSGin5G service. But the legacy UEs and the non-3gpp UEs does not support communication with the SEAL enabler. None of the prior arts define or discloses a method and system for authentication and authorization between the UE and the MSGin5G Server or the application server that is compatible with all UEs irrespective of support of SEAL.

Thus, there is a need to address the above problem and provide a solution for authentication and authorization without SEAL support to have a generalized common method.

DISCLOSURE OF INVENTION

Technical Problem

The principal object of the embodiments herein is to provide a method and system for authentication and authorization in the MSGin5G service.

Another object of the embodiments herein is to provide authentication and authorization between 5GMSGS UE or legacy UE or non-3GPP UE and the MSGin5G server, wherein the legacy UE and the non-3GPP UE communicates through a gateway (legacy UE gateway or non-3GPP UE gateway).

Another object of the embodiments herein is to provide the authentication and authorization for 5GMSGS UE with the support of SEAL enabler (Service Enabler Architecture Layer for Verticals).

Another object of the embodiments herein is to provide the authentication and authorization for the 5GMSGS UE independent of the SEAL enabler.

Another object of embodiments herein is to perform the authentication and authorization using a Transport Layer Security pre-shared key (TLS-PSK) and a token-based mechanism.

Another object of embodiments herein is to perform the authentication and authorization using an Internet key exchange version two-pre-shared key (IKEv2-PSK) and a token-based mechanism.

Another object herein is to define a common independent key management server, which serves to derive a pre-shared secret for services such as EDGE, V2X, MSGin5G so on. The term independent here states that the secret derived or the pre-shared key derived is independent of the keys derived in the EAP-AKA'/5G-AKA authentication procedure.

Solution to Problem

Accordingly the embodiment herein is to provide a method and system for authentication and authorization in message service for Massive Internet of Things (MIoT) over 5G (5th Generation) System (MSGin5G) service. The proposed method is to use Transport Layer Security pre-shared key ciphersuites (TLS-PSK) based authentication for the authentication between MSGin5G User Equipment (UE) and the MSGin5G service where authentication server function acts as the key management function. Further, the proposed method provides solutions to satisfy the security requirements for MSGin5G Service (message service for MIoT over 5G System).

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

Advantageous Effects of Invention

According to the disclosure, there is improvements in and relating to a MSGIN5G server.

BRIEF DESCRIPTION OF DRAWINGS

This method is illustrated in the accompanying drawings, throughout which like reference letters indicate corresponding parts in the various figures. The embodiments herein will be better understood from the following description with reference to the drawings, in which:

FIG. 3 illustrates the MSGin5G system architecture for non-roaming, according to the prior art;

FIG. 4 illustrates a scenario of message from UE to application in MSGin5G, according to the prior art;

MODE FOR THE INVENTION

Figure 1:
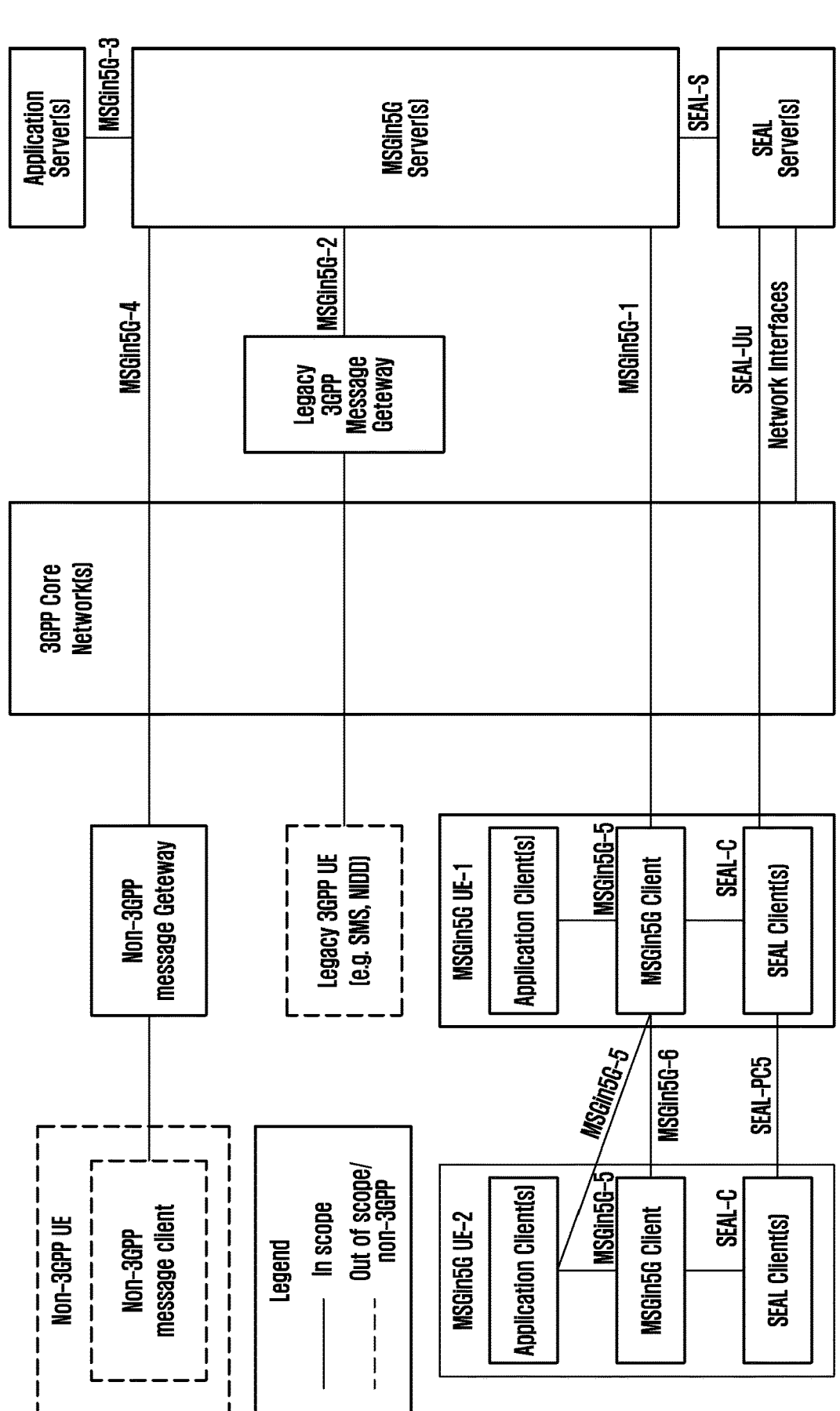
FIG. 1 illustrates application architecture for MSGin5G service, according to the prior art.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments may be combined with one or more other embodiments to form new embodiments. The term "or" as used herein, refers to a non-exclusive or, unless otherwise indicated. The examples used herein are intended merely to facilitate an understanding of ways in which the embodiments herein may be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The term "MSGin5G server", "MSGF" and "MSG server" are used interchangeably throughout the document which solely refers to the MSGin5G server.

The term "MSGin5G UE" and "5GMSGS UE" are used interchangeably throughout the document.

Throughout the document here methods (which includes SEAL enabler), the term "UE" collectively refers to "5GMSGS client" and "SEAL client" i.e., when referred as UE it may be either 5GMSG client or SEAL client.

The term "MSGin5G service ID" or "MSGin5G service identifier" is equivalent to the "Service ID" for legacy UE and non-3GPP UE.

Accordingly the embodiment herein is to provide a method and system for authentication and authorization in message service for Massive Internet of Things (MIoT) over 5G (5th Generation) System (MSGin5G) service. The proposed method is to use Transport Layer Security pre-shared key cipher suites (TLS-PSK) based authentication for the authentication between a MSGin5G User Equipment (UE) and a MSGin5G server where authentication server function acts as the key management function. Further, the proposed method provides solutions to satisfy the security requirements for MSGin5G Service (message service for MIoT over 5G System).

The proposed solutions are to satisfy the security requirements for MSGin5G Service (message service for MIoT over 5G System). For point to point message, 5GMSGS the UE may initiate an MSGin5G message request to the 5GMSGS UE, the legacy 3GPP UE or the Non-3GPPP UE, upon receiving the message, and the legacy 3GPP UE or the Non-3GPP UE may reply the message.

For application to point message, an Application Server may initiate the MSGin5G message request to the 5GMSGS UE, the legacy 3GPP UE or the Non-3GPPP UE, upon receiving the message, the legacy 3GPP UE or the Non-3GPP UE may reply the message. For group message, the 5GMSGS UE may initiate the MSGin5G message request to a 5GMSGS Group, all the UEs in the group may send message to the 5GMSGS Group as specified in the requirement [R-5.4.2-001] in 3GPP TS 22.262. MSGin5G Service supports UE: that could be Internet Protocol (IP) Multimedia Subsystem (IMS) and non-IMS base; a non-IMS UE may be 3GPP UE and non-3GPP UE; and the 5GMSGS UE comprises both application client (optional) and the 5GMSGS client.

Figure 2:
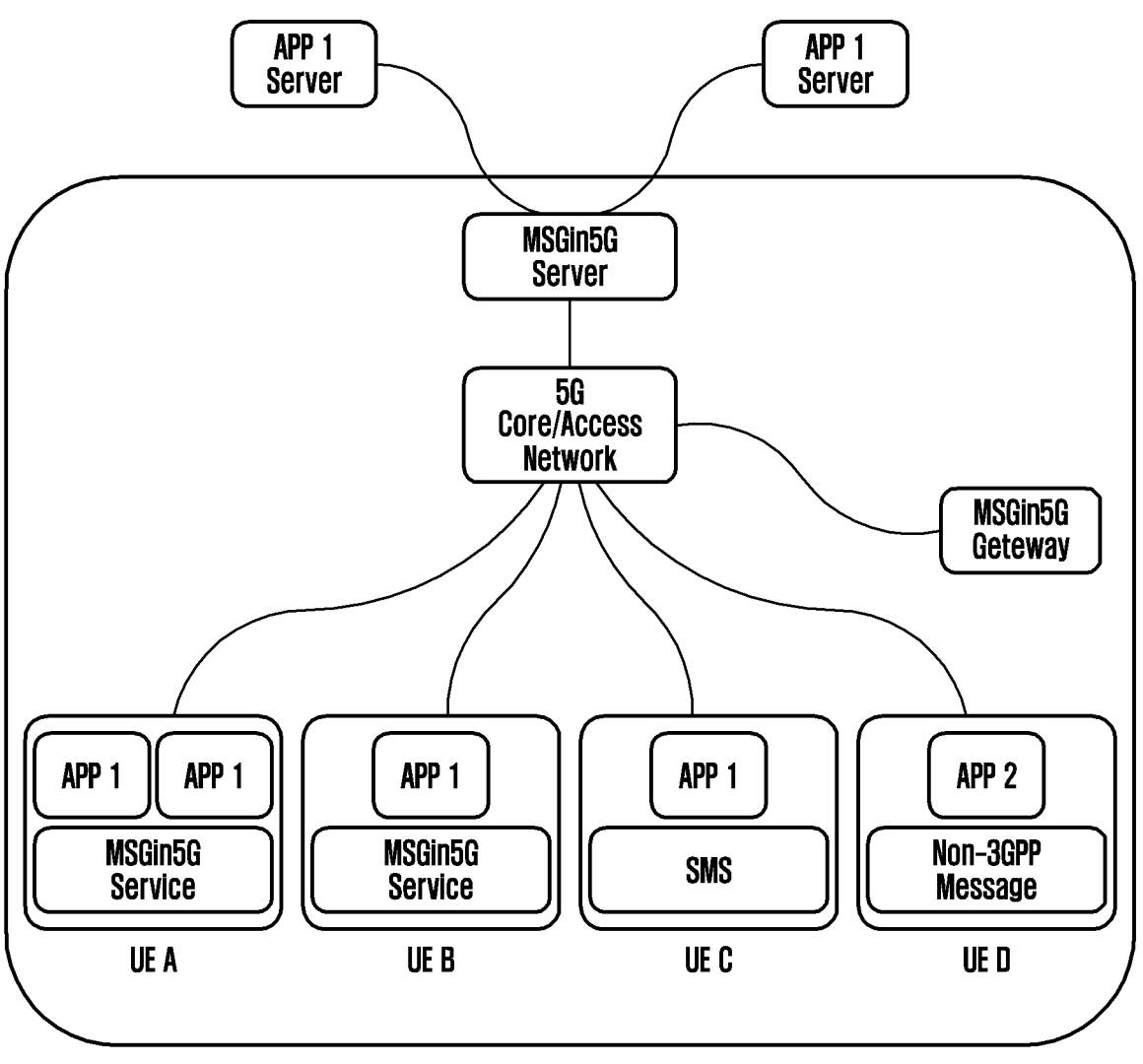
FIG. 2 illustrates the MSGin5G service architecture, according to the prior art.

The UE types A/B/C/D as seen in FIG. 2 corresponds to as described in 3GPP TS 22.262. The MSGin5G UE type corresponds to both types A and B. The Legacy 3GPP type is derived from type C and supports NIDD, broadcast, etc. in addition to SMS. Legacy 3GPP UE type may also originate MSGin5G Application Service messaging. The Non-3GPP type is derived from type D.

The MSGin5G Service is supported between Mobile Originated Mobile Terminated (MOMT) messaging, where messages are originated and terminated at the UEs.

Most UEs in this scenario do not have the limitation of power, and are online most time. The MSGin5G Service supports Mobile Originated Application Terminated (MOAT) messaging, where the messages are originated at the UE and terminated at the application server in the network. The MSGin5G Service supports Application Originated Mobile Terminated (AOMT) messaging, where the messages are originated at the application server in the network and terminated at the UE. The MSGin5G Service supports Application Originated Mobile Terminated messaging service with a max latency of 10 seconds while maintaining battery life of at least 3 months for small data traffic once every hour and typical sized IoT battery [200-500 mAh].

All kinds of UE (e.g. application server, devices with or without power and computation limitation, devices always online or usually without IP connection) may use MSGin5G services.

Considering a scenario where a Controller UE1 (e.g. a mobile handset terminal 1 or an application client APP 1 in a mobile handset Terminal 1) communicates with a Controlled UE2 (e.g. wearable devices Terminal 2 like smart watch). Both the UE1 and the UE2 are the MSGin5G UE type and connected to a same 5G system, use MSGin5G service and served by same MSGin5G application layer. In such cases, the TLS-PSK based authentication is more reliable and feasible as, other IPsec based methods or certificate based methods may require 3GPP devices such as wearable devices or any IoT home devices to support the certificate validation capability which would turn into an overhead for least capable devices to support.

Therefore, the proposed invention supports a TLS-PSK based authentication method which uses the 3GPP credentials itself instead of managing certificates.

Referring now to the drawings and more particularly to FIGS. 1 through 18, where similar reference characters denote corresponding features consistently throughout the figures, there are shown preferred embodiments.

FIG. 1 illustrates application architecture for MSGin5G service, according to the prior art.

Referring to the FIG. 1, the application architecture of conventional method and system for the MSGin5G Service. The MSGin5G Service fulfils service requirements which are enumerated in 3GPP TS 22.262.

In an embodiment, MSGin5G gateway is in between the MSGin5G Client and MSGin5G Server and the MSGin5G-1 is the interface through a gateway between a 5GMSGS client and the MSGin5G Server. The MSGin5G gateway supports registration of the 5GMSGS client to the MSGin5G Server when not using IMS based solution; and also supports the exchange of MSGin5G messages.

Further, an MSGin5G gateway is a gateway between the MSGin5G Server and the Legacy 3GPP Message and the MSGin5G-2 is the interface via a gateway between a 5GMSGS client and the MSGin5G Server. The MSGin5G-2 reference point supports, indication of an underlying message delivery mechanism to the Legacy 3GPP Message Gateway; exchange of MSGin5G messages; and registration of the Legacy 3GPP Message Gateway to MSGin5G Server.

An MSGin5G-3 is an interface between an Application Server and the MSGin5G Server. This MSGin5G-3 reference point supports an access to the MSGin5G Server and APIs to enable sending and receiving of the MSGin5G messages; and adherence to (Common API framework) CAPIF as specified in 3GPP TS 23.222.

An MSGin5G-4 is an interface between a Non-3GPP Message Gateway and the MSGin5G server. This MSGin5G-4 reference point supports registration of the Non-3GPP Message Gateway to the MSGin5G Server; and the exchange of the MSGin5G messages.

FIG. 2 illustrates the MSGin5G service architecture, according to the prior art.

The MSGin5G service architecture as shown in FIG. 2 is a high-level diagram mapped onto the 5G architecture as specified in 3GPP TS 23.501 in order to verify if the MSGin5G service may be provided by the 5G architecture. The MSGin5G service architecture as shown in FIG. 2 is taken from 3GPP TS 22.262 and shows the consolidated service architecture for all scenarios. The architecture in FIG. 2 comprises a UE A, which is a controller UE which uses the MSGin5G Service to send messages to the controlled UEs, through an Application Server in case the MSGin5G Server is unable to deal with application specific issues.

A UE B is a controlled UE that supports the MSGin5G Service. A UE C is a controlled UE which doesn't support the MSGin5G Service, but supports the SMS. The MSGin5G Server converts the MSGin5G messages into SMS messages.

A UE D is a controller UE or a controlled UE which doesn't support the MSGin5G Service, but supports the non-3GPP messaging service.

All the UEs (UE A, UE B, UE C and UE D) use the NG-RAN, either via the NR access network or via a non-3GPP access network.

Figure 3:
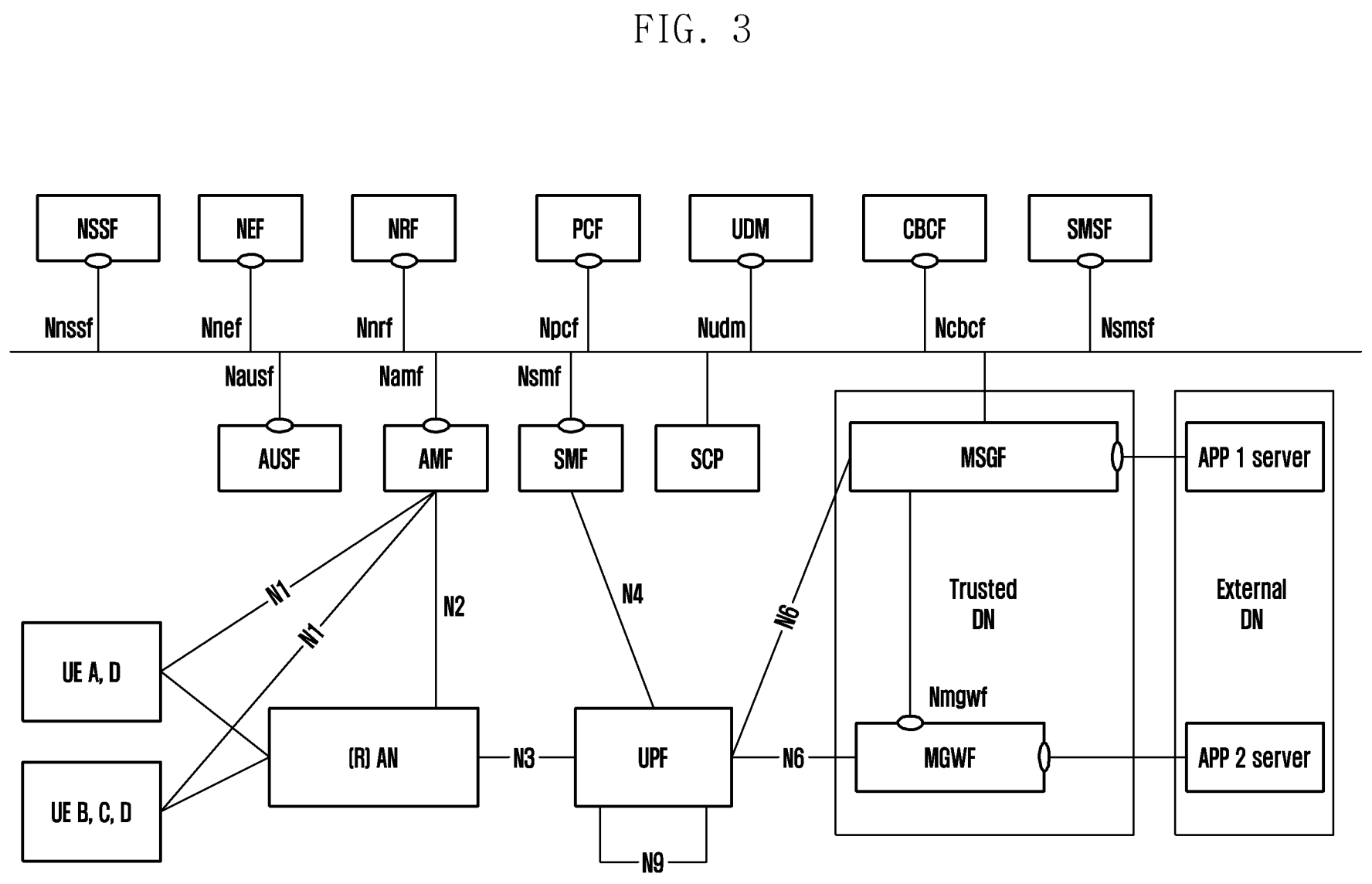

FIG. 3 illustrates the MSGin5G system architecture for non-roaming, according to the prior art.

The MSGin5G architecture in FIG. 3 is from 3GPP TS 23.501 where the MSGF and the MGWF reside in a trusted Distributed Network (DN).

All the UEs in FIG. 3 are connected to the NG-RAN. The 5GMSGS UE and the Non-3GPP UE are the controller UEs and the 5GMSGS UE, the legacy 3GPP UE and the Non-3GPP UE are controlled UEs. The MSGin5G Server is shown as the MSGin5G Function (MSGF) in FIG. 3. The MSGin5G Gateway is shown as the MSGin5G Gateway Function (MGWF) and the APP Server connects directly to the MSGF (in case it supports the MSGin5G Service) or to the MGWF (if it supports a non-3GPP messaging service) and may reside outside the 5GS in an external DN. The MSGF manages the distribution of the messages it has received from the 5GMSGS UE, the Non-3GPP UE, from the APP Server, or from the MSGF. The MSGF may use application specific functionality from the APP server that doesn't reside in the MSGF itself.

A Cell Broadcast Centre Function (CBCF) is specified in 3GPP in 3GPP TS 23.041 and is used for broadcasting messages in the MSGin5G message format to the 5GMSGS UE devices and in separate messages in the non-3GPP message format to the Non-3GPP UED devices. Even though the CBCF is shown in FIG. 3 as a Service Producer network function, it has no service-based interface. This interface could be specified in stage 2 or ATIS-0700008.v002. The SMSF is specified in 3GPP TS 23.501 and its services may be invoked by the MSGF to send a message as SMS to Legacy 3GPP UE.

Messages towards the Non-3GPP UE devices are sent from the MSGF in MSGin5G format to the MGWF and are converted by the MGWF into the non-3GPP message format and also distributed by the MSGF. The APP Server may be used to create messages in the MSGin5G format and the APP Server may receive messages from 5GMSGS UE or Non-3GPP UE. These messages are routed to the MSGF for further distribution to UEs of type 5GMSGS UE, Legacy 3GPP UE or Non-3GPP UE. The APP Server that doesn't support the MSGin5G Service may send its messages to the MGWF, which converts the message to MSGin5G format before forwarding it to the MSGF.

The 5GMSGS UE may send its MSGin5G messages to the MSGF via the Control Plane or the User Plane (see Key Issue 5 in TR 23.700-24). Non-3GPP UE may send messages in a non-3GPP message format via the Control Plane or the User Plane (see Key Issue 5 in TR 23.700-24) to the MGWF and the MGWF will convert the message into an MSGin5G message format before forwarding it to the MSGF.

Figure 4:
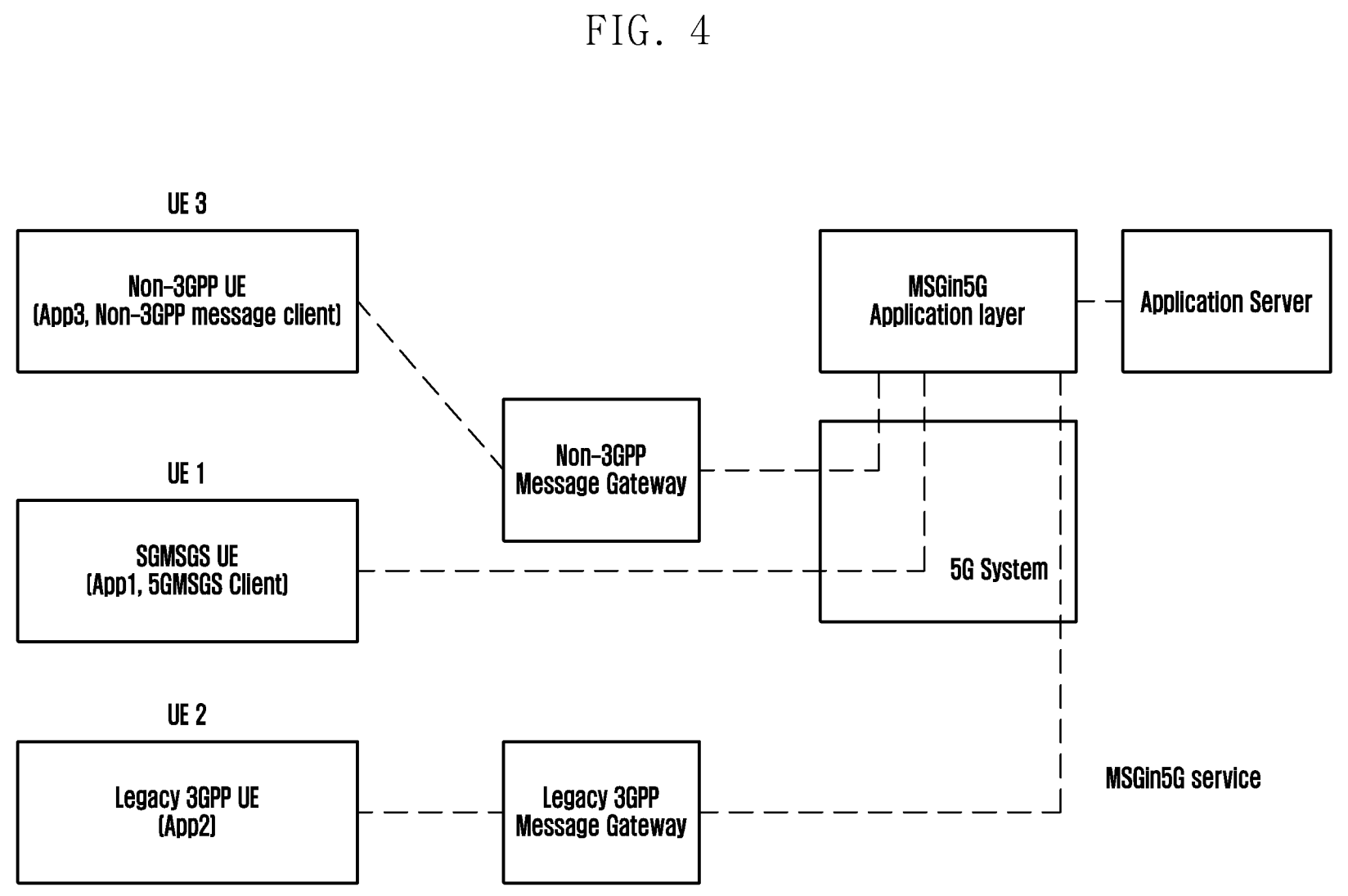

FIG. 4 illustrates a scenario of message from the UE to an application in MSGin5G, according to the prior art.

According to the application architecture as shown in FIG. 1, the 5GMSGS UE supports the SEAL enabler for MSGin5G service.

But other UEs such as the legacy UEs and the non-3gpp UEs does not support communication with the SEAL enabler. Therefore, there should be a method or system defined for authentication and authorization between the UE and the MSGin5G Server or the Application server that is compatible with all the UEs irrespective of support of SEAL. In other words, there should be a solution for authentication and authorization without SEAL support to have a generalized common method.

Further, the TS 33.434 defines a procedure for authentication and authorization of VAL UE. The procedure uses OpenID connect authenticating and authorizing the VAL UE by the server. If OIDC is not supported by the UE, there should be other mechanism for authentication and authorization supported by SEAL Enabler up to the vertical provider.

Figure 5:
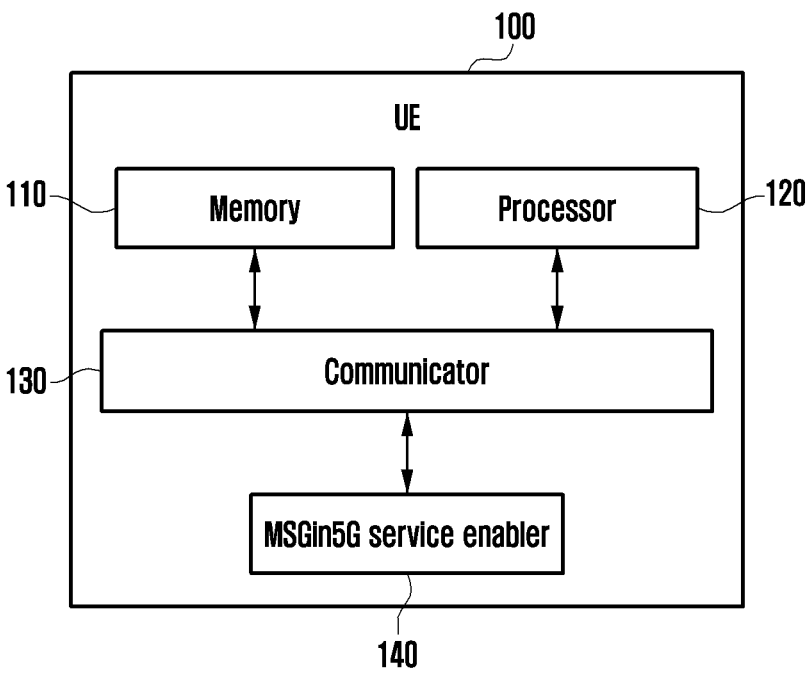
FIG. 5 illustrates a block diagram of a User Equipment (UE) for authentication and authorization in the MSGin5G service according to an embodiment as disclosed herein

FIG. 5 illustrates a block diagram of a User Equipment (UE) (500) for authentication and authorization in the MSGin5G service according to an embodiment as disclosed herein.

Examples of the UE (500) include, but are not limited to a smartphone, a tablet computer, a Personal Digital Assistance (PDA), an Internet of Things (IoT) device, a wearable device, etc. Furthermore, the UE (100) includes a memory (510), a processor (520), a communicator (530) and a MSGin5G service enabler (540).

In an embodiment, the UE (500) may be termed as the MSGin5 client (500), or a SEAL client (500). Further, the UE (500) interacts with the MSGin5 server, the SEAL Server and at least one network entity. The network entities may be an Authentication Server Function (AUSF), a Unified Data Management (UDM) block, and an Access and Mobility Management Function (AMF), In an embodiment, the memory (510) is configured to store keys associated with the MSGin5G services. The memory (510) stores instructions to be executed by the processor (520). The memory (510) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (510) may, in some examples, be considered a non-transitory storage medium. The term "non-transitory" may indicate that the storage medium is not embodied in a carrier wave or a propagated signal. However, the term "non-transitory" should not be interpreted that the memory (510) is non-movable. In some examples, the memory (510) may be configured to store larger amounts of information than the memory. In certain examples, a non-transitory storage medium may store data that can, over time, change (e.g., in Random Access Memory (RAM) or cache). The memory (510) may be an internal storage unit or it may be an external storage unit of the UE (500), a cloud storage, or any other type of external storage.

The processor (520) communicates with the memory (510), the communicator (530), and the MSGin5G service enabler (540). The processor (520) is configured to execute instructions stored in the memory (510) and to perform various processes. The processor (520) may include one or a plurality of processors, may be a general-purpose processor, such as a central processing unit (CPU), an application processor (AP), or the like, a graphics-only processing unit such as a graphics processing unit (GPU), a visual processing unit (VPU), and/or an Artificial intelligence (AI) dedicated processor such as a neural processing unit (NPU).

The communicator (530) is configured for communicating internally between internal hardware components and with external devices (e.g. AAnF server, UDM, server, etc.) via one or more networks (e.g. Radio technology). The communicator (530) includes an electronic circuit specific to a standard that enables wired or wireless communication.

The MSGin5G service enabler controller (540) is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like.

In an embodiment, the MSGin5G service enabler (140) establishes communication with the MSGin5G server and the SEAL server. Further, the MSGin5G service enabler (140) uses a Transport Layer Security pre-shared key ciphersuites (TLS-PSK) based authentication for the authentication between MSGin5G User Equipment (UE) and the MSGin5G service where authentication server function acts as the key management function. Further, the MSGin5G service enabler (540) provides solutions to satisfy the security requirements for MSGin5G Service (message service for MIoT over 5G System)

Although the FIG. 5 shows various hardware components of the UE (500) but it is to be understood that other embodiments are not limited thereon. In other embodiments, the UE (500) may include less or more number of components. Further, the labels or names of the components are used only for illustrative purpose and does not limit the scope of the invention. One or more components may be combined to perform the same or substantially similar function to enabling the MSGin5G service.

Figure 6:
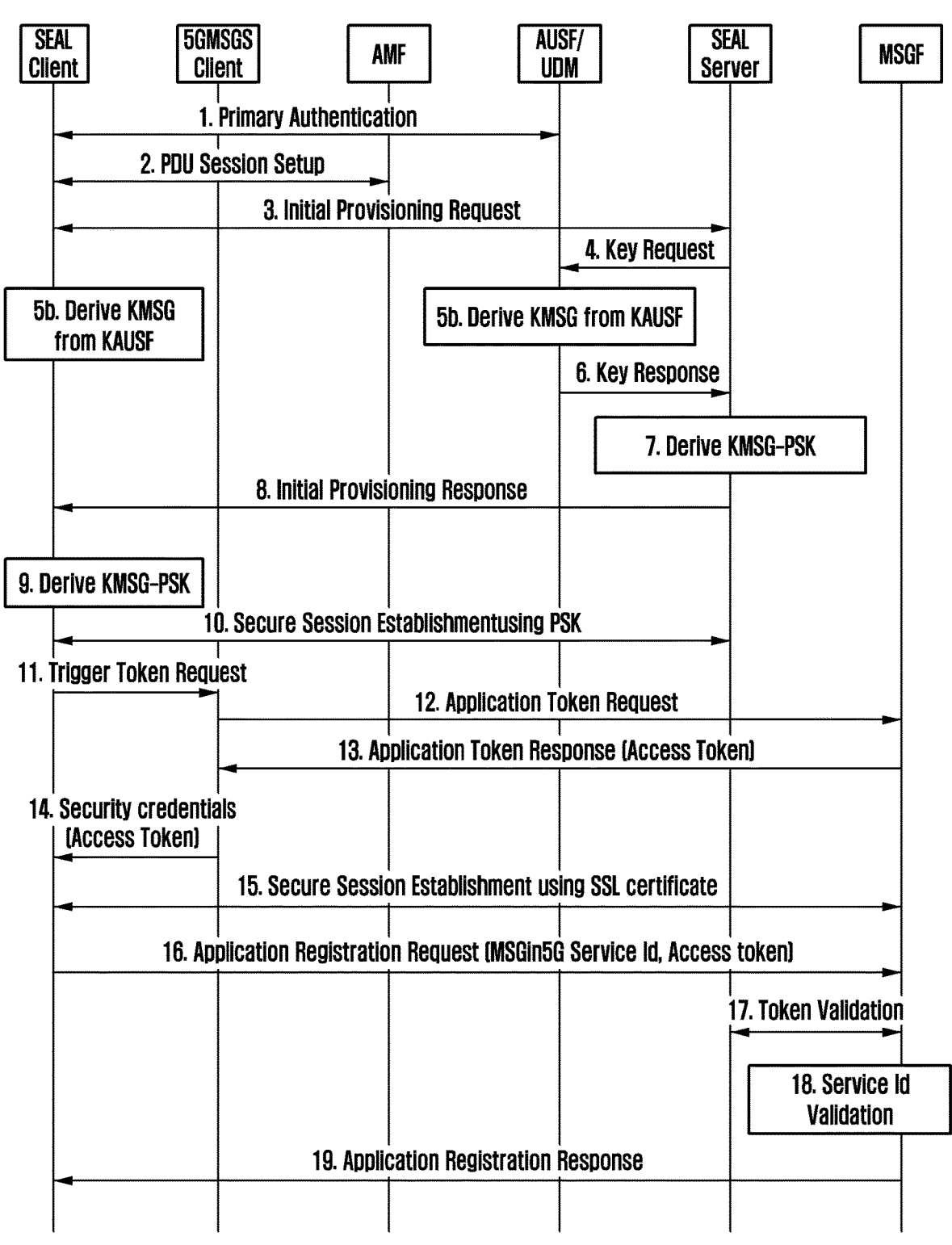
FIG. 6 is illustrating a procedure where the Authentication Server Function (AUSF) acts as the key management server, according to the embodiments as disclosed herein.

FIG. 6 is a sequence diagram, illustrating a procedure where the AUSF acts as the key management server for authentication and authorization in the MSGin5G service, according to the embodiments as disclosed herein.

The method in FIG. 6 uses TLS-PSK based authentication for the authentication between the MSGin5G UE and the MSGin5G service where authentication server function acts as the key management function. As seen in FIG. 6, the 5GMSGS client and the SEAL client interacts with the SEAL server and the MSGin5 server.

At 1, the UE (500) initiates the initial registration procedure with the AUSF, as defined in TS 23.502 to get a 5G Core network access. At the end of the network access authentication procedure (Primary authentication and key agreement [TS 33.501, clause 6.1]), the UE (500) and the AUSF are in possession of AUSF key $K_{AUSF}$.

In an embodiment a SEAL client can be collocated in MSGin5G Client. Therefore, both "SEAL client" and "MSGin5G client" refers to same network entity in this invention.

In an embodiment a SEAL server can be collocated in MSGin5G Server. Therefore, both "SEAL server" and "MSGin5G server" refers to same network entity in this invention.

In an embodiment, the UE (500) and the AMF performs a capability exchange procedure and agree upon the method of authentication for the MSGin5G service using existing NAS procedure or during the PDU session/NAS context establishment at 2.

In another embodiment, the UE (500) and the AMF performs a service capability exchange procedure. In this procedure the UE (500) and AMF agree upon the method of authentication for the MSGin5G service.

In an embodiment, the UE (500) sends the service capability exchange request to the AMF indicating the methods for authentication the UE (500) may support and the AMF selects the methods to be used further. The AMF indicates the selected method to the UE (500) in service capability exchange response message.

At 3, the UE (500) initiate the Initial service provisioning procedure with the SEAL server. In this step, UE (500) sends a 5G-GUTI or a Routing Identifier.

At 4, the SEAL server sends a key request to the designated AUSF. At 5, the designated AUSF derives the MSGin5G service key ($K_{MSG}$) from the $K_{AUSF}$. Alternatively, the EMSK is the $K_{AUSF}$ and MSK is the $K_{MSG}$. The AUSF sends back the derived $K_{MSG}$ in the key response at 6.

At 7, the SEAL server derives the pre-shared key $K_{MSG-PSK}$ from the $K_{MSG}$ and sends the initial service provisioning response to the 5GMSGS client at 8. On receiving the initial service provisioning response, the 5GMSGS client derives the $K_{MSG-PSK}$ at 9.

In another embodiment instead of initial provisioning procedure to establish a shared secret the UE/SEAL client and the SEAL server may authenticate each other based on the shared key generated (as described below in method A). The shared key is used as a master key to generate TLS session keys, and also as the proof of secret key possession as part of the authentication function. The usage of Pre-Shared Key Cipher suites for Transport Layer Security (TLS) is specified in the TLS profile given in TS 33.310, Annex E.

Method 'A': In an embodiment, the UE/SEAL client contacts the SEAL server, and indicates to the SEAL server that it supports PSK-based TLS by adding one or more PSK-based cipher suites to the ClientHello message. If the SEAL server is willing to establish a TLS tunnel using a PSK-based cipher suite, its selects one of the PSK-based cipher suites offered by the UE, and send the selected cipher suite to the UE (500) in the ServerHello message. The SEAL server sends the Server Key Exchange message with a string "3GPP-MSG-TLS" used as PSK-identity hint to indicate MSG based keying is supported and TLS is supported for authentication.

In another embodiment the Server Key Exchange message includes the PSK-identity hints for all supported authentication methods. The UE (500)/SEAL client then uses the MSG based keys as the shared secret to derive the further PSK keys. The UE (500)/SEAL client and the SEAL have established a TLS tunnel using a shared secret, and uses the application level communication through this tunnel.

On successful initial service provisioning procedure the 5GMSGS client and the SEAL server establishes the TLS session using pre-shared key $K_{MSG-PSK}$ at 10.

After successful TLS session establishment the 5GMSGS client sends a trigger message to the SEAL client to trigger an access token request at 11. Accordingly, the SEAL client sends an application token request to the SEAL server at 12. The SEAL server provides the SEAL client with an access token at 13. The acquired access token is shared with 5GMSGS client at 14.

Before sending the access token for authorization to the MSGin5G server, the 5GMSGS client establishes a secure channel using certificates at 15.

At 16, the 5GMSGS client sends the access token in an application registration request to the MSGin5G server along with the MSGin5G service ID. At 17, the SEAL server validates the received access token and the MSGin5G server validates the service request by validating the MSGin5G service ID at 18. On successful verification MSGin5G server sends the application registration response at 19.

Figure 7:
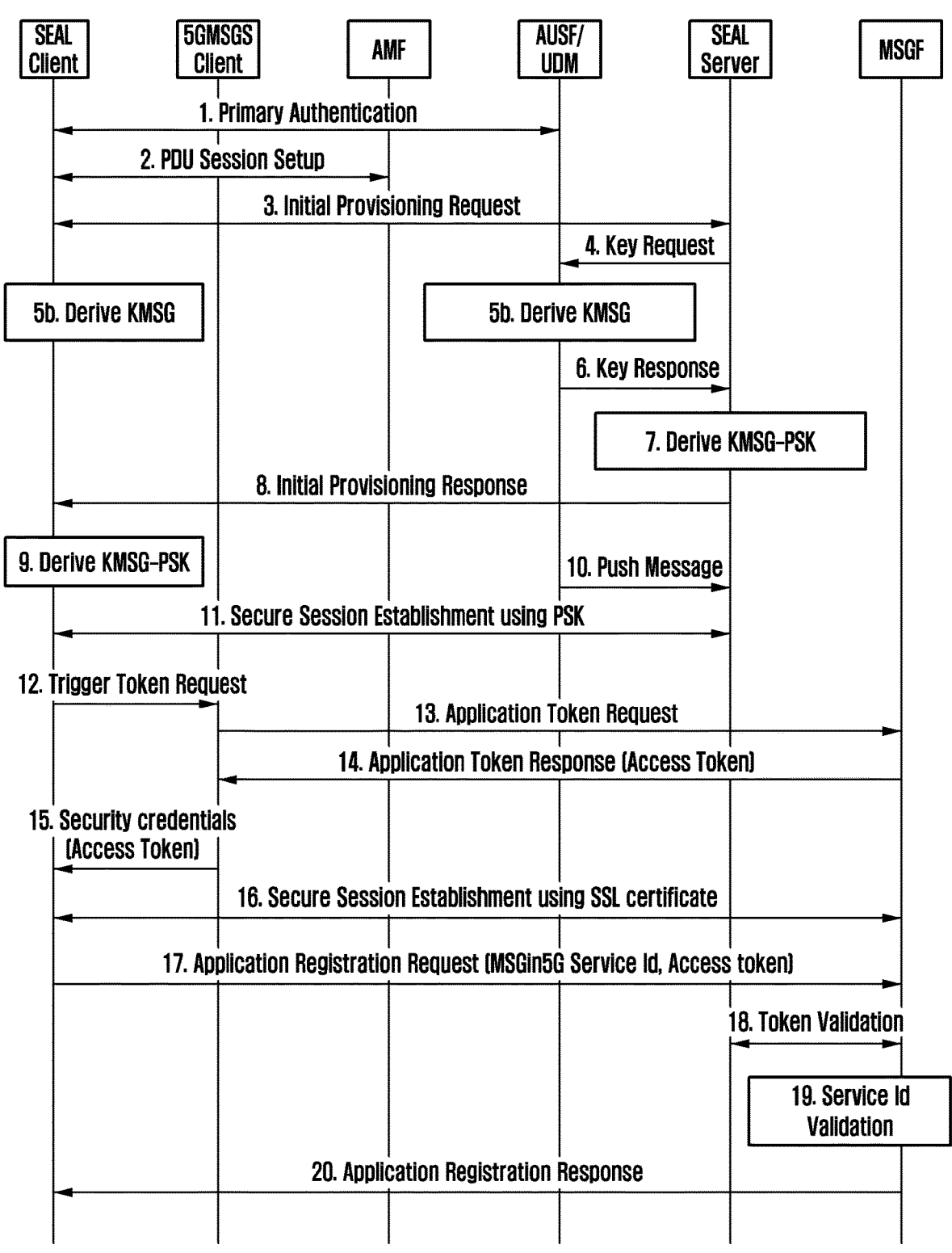
FIG. 7 is illustrating a procedure where the AUSF acts as the key management server and key for MSGin5G service derived at AMF, according to the embodiments as disclosed herein.

FIG. 7 is a sequence diagram, illustrating a method authentication and authorization in the MSGin5G service, where the AUSF acts as a key management server and key for MSGin5G service is derived at the AMF, according to the embodiments as disclosed herein.

At 1, the UE (500) initiates the initial registration procedure as defined in TS 23.502 to get a 5G Core network access.

In an embodiment, the UE (500) and the AMF performs the capability exchange procedure and agree upon the method of authentication for the MSGin5G service using existing Non-Access Stratum (NAS) procedure or during a Packet Data Unit (PDU) session/NAS context establishment.

In another embodiment, the UE (500) and the AMF performs the service capability exchange procedure. In this procedure the UE (500) and the AMF agree upon the method of authentication for the MSGin5G service.

In an embodiment, UE (500) sends the service capability exchange request to the AMF indicating the methods for authentication UE (500) may support and the AMF selects the methods to be used further. The AMF indicates the selected method to the UE (500) in service capability exchange response message.

In an embodiment the SEAL client can be collocated in the MSGin5G Client. Therefore, both "SEAL client" and "MSGin5G client" refers to same network entity in the present invention.

In an embodiment the SEAL server can be collocated in the MSGin5G Server. Therefore, both the "SEAL server" and the "MSGin5G server" refers to same network entity in the present invention.

At 3, the UE (500) initiate the Initial service provisioning procedure with the authentication server (AUSF). At 4, the AUSF sends a key request to a designated AMF. At 5, the AMF derives the MSGin5G service key ($K_{MSG}$) from $K_{AMF}$/ $K_{SEAF}$. The AMF sends back the derived $K_{MSG}$ in the key response to the AUSF at 6. At 7, the AUSF derives the pre-shared key $K_{MSG-PSK}$ from $K_{MSG}$ and sends the initial service provisioning response to the 5GMSGS client at 8. At 9, upon receiving the initial service provisioning response, the 5GMSGS client derives the $K_{MSG-PSK}$.

In another embodiment instead of initial provisioning procedure to establish a shared secret the UE (500)/SEAL client and the SEAL server may authenticate each other based on the shared key generated (as described in method A below). The shared key is used as a master key to generate the TLS session keys, and also as the proof of secret key possession as part of the authentication function. The usage of Pre-Shared Key Cipher suites for Transport Layer Security (TLS) is specified in the TLS profile given in TS 33.310, Annex E.

Method 'A': In an embodiment, UE (500)/SEAL client contacts the SEAL server, and may indicate to the SEAL server that the UE (500)/SEAL client supports PSK-based TLS by adding one or more PSK-based cipher suites to the ClientHello message. If the SEAL server is willing to establish the TLS tunnel using the PSK-based cipher suite, then, the SEAL server selects one of the PSK-based cipher suites offered by the UE (500), and send the selected cipher suite to the UE (500) in the ServerHello message. The SEAL server sends the ServerKeyExchange message with a string "3GPP-MSG-TLS" used as PSK-identity hint to indicate MSG based keying is supported and TLS is supported for authentication.

In another embodiment the ServerKeyExchange message includes the PSK-identity hints for all supported authentication methods. The UE (500)/SEAL client then uses the MSG based keys as the shared secret to derive the further PSK keys. The UE (500)/SEAL client and the SEAL have established a TLS tunnel using the shared secret, and uses the application level communication through this tunnel.

At 10, the AUSF pushes the received pre-shared key ($K_{MSG-PSK}$) with the SEAL server.

On successful initial service provisioning procedure the 5GMSGS client and the SEAL server establishes a TLS session using pre-shared key $K_{MSG-PSK}$ at 11.

On successful TLS session establishment the 5GMSGS client sends a trigger message to the SEAL client to trigger an access token request at 12. Accordingly, the SEAL client sends an application token request to the SEAL server at 13. The SEAL server provides the SEAL client with an access token at 14. The acquired access token is shared with 5GMSGS client at 15.

Before sending the access token for authorization to the MSGin5G server, the 5GMSGS client establishes a secure channel using certificates at 16.

The 5GMSGS client sends the access token in an application registration request to the MSGin5G server along with the MSGin5G service ID at 17.

The SEAL server validates the received access token at 18 and the MSGin5G server validates the service request by validating the MSGin5G service ID at 19. On successful verification MSGin5G server sends the application registration response at 20.

Figure 8:
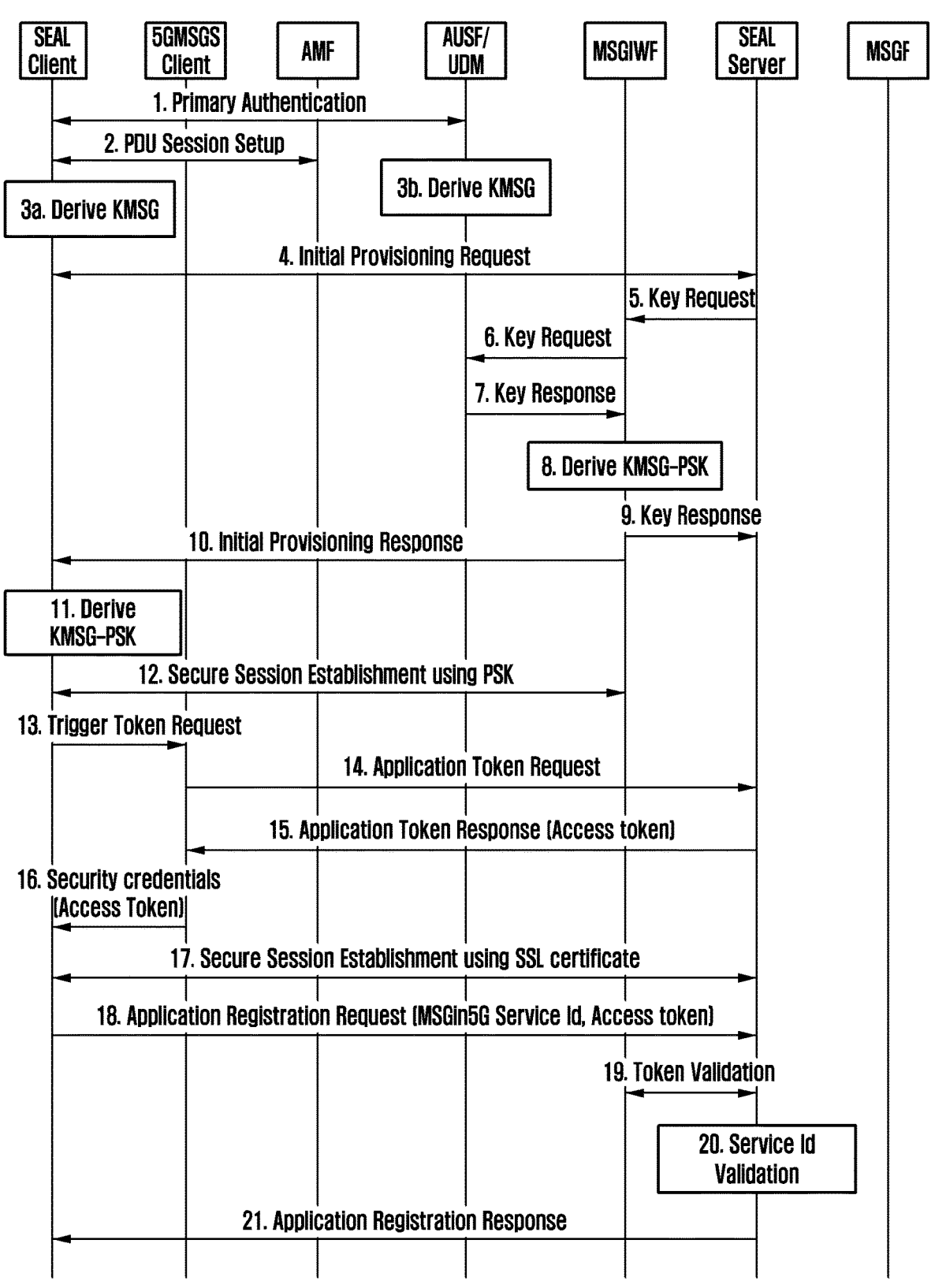
FIGS. 8-9 is illustrating a procedure where an interworking function is introduced to act as the key management server, according to the embodiments as disclosed herein.

FIG. 8 is a schematic diagram, illustrating a method for authentication and authorization in the MSGin5G service, where an interworking function is introduced to act as the key management server, according to the embodiments as disclosed herein.

At 1, the UE (500) initiates the initial registration procedure as defined in TS 23.502 to get the 5G Core network access. At the end of the network access authentication procedure (Primary authentication and key agreement [TS 33.501, clause 6.1]), the UE (500) and the AUSF are in possession of the key $K_{AUSF}$.

In an embodiment, the UE (500) and the AMF performs the capability exchange procedure and agree upon the method of authentication for the MSGin5G service using existing NAS procedure or during the PDU session/NAS context establishment.

In another embodiment, the UE (500) and the AMF performs the service capability exchange procedure at 2. In this procedure the UE (500) and the AMF agree upon the method of authentication for the MSGin5G service.

In an embodiment, the UE (500) sends the service capability exchange request to the AMF indicating the methods for authentication UE (500) may support and the AMF selects the methods to be used further. The AMF indicates the selected method to the UE (500) in service capability exchange response message.

At 4, the UE (500) initiate the Initial service provisioning procedure with the authentication server. The SEAL server sends a key request to the designated MSGin5G interworking functions at 5. The MSGin5G interworking function forwards the key request to the AUSF at 6. The AUSF sends back a derived $K_{MSG}$ in the key response at 7. On receiving the $K_{MSG}$ key, the MSGIWF derives a pre-shared key ($K_{MSG-PSK}$) from $K_{MSG}$ at 8 and sends it to the SEAL server at 9. In an embodiment, the SEAL server derives the pre-shared key $K_{MSG-PSK}$ at 9.

In another embodiment, the SEAL Server or the MSGIWF directly sends the key request to the AMF/SEAF. The AMF/SEAF derives the $K_{MSG}$ from the $K_{SEAF}$/$K_{AMF}$. The SEAL server/MSGIWF identifies the AMF using a 5G-NR Global Unique Temporary Identifier (5G-GUTI) that has a Globally Unique AMF Id (GAUMI), which uniquely identifies one AMF.

The SEAL server sends the initial service provisioning response to the 5GMSGS client at 10. On receiving the initial service provisioning response, the 5GMSGS client derives the $K_{MSG-PSK}$ at 11.

In another embodiment instead of initial provisioning procedure to establish the shared secret the UE (500)/SEAL client and the SEAL server may authenticate each other based on the shared key generated (as described in method A). The shared key is used as a master key to generate TLS session keys, and also as the proof of secret key possession as part of the authentication function. The usage of Pre-Shared Key Cipher suites for Transport Layer Security (TLS) is specified in the TLS profile given in TS 33.310, Annex E.

Method 'A': In an embodiment, UE (500)/SEAL client contacts a SEAL server, it may indicate to the SEAL server that it supports PSK-based TLS by adding one or more PSK-based cipher suites to the ClientHello message. If the SEAL server is willing to establish a TLS tunnel using a PSK-based cipher suite, its selects one of the PSK-based cipher suites offered by the UE (500), and send the selected cipher suite to the UE (500) in the ServerHello message. The SEAL server sends the ServerKeyExchange message with a string "3GPP-MSG-TLS" used as PSK-identity hint to indicate MSG based keying is supported and TLS is supported for authentication.

In another embodiment the ServerKeyExchange message includes the PSK-identity hints for all supported authentication methods. The UE (500)/SEAL client then uses the MSG based keys as the shared secret to derive the further PSK keys. The UE (500)/SEAL client and the SEAL have established a TLS tunnel using a shared secret, and uses the application level communication through this tunnel On successful initial service provisioning procedure the 5GMSGS client and SEAL server establishes a TLS session using pre-shared key $K_{MSG-PSK}$ at 12.

On successful TLS session establishment the 5GMSGS client sends a trigger message to the SEAL client to trigger an access token request at 13. Accordingly, the SEAL client sends an application token request to the SEAL server at 14.

The SEAL server provides the SEAL client with an access token at 15. The acquired access token is shared with 5GMSGS client at 16.

Before sending the access token for authorization to the MSGin5G server, the 5GMSGS client establishes a secure channel using certificates at 17.

The 5GMSGS client sends the access token in an application registration request to the MSGin5G server along with the MSGin5G service ID at 18.

The SEAL server validates the received access token at 19 and the MSGin5G server validates the service request by validating the MSGin5G service ID at 20. On successful verification MSGin5G server sends the application registration response at 21.

Figure 9:
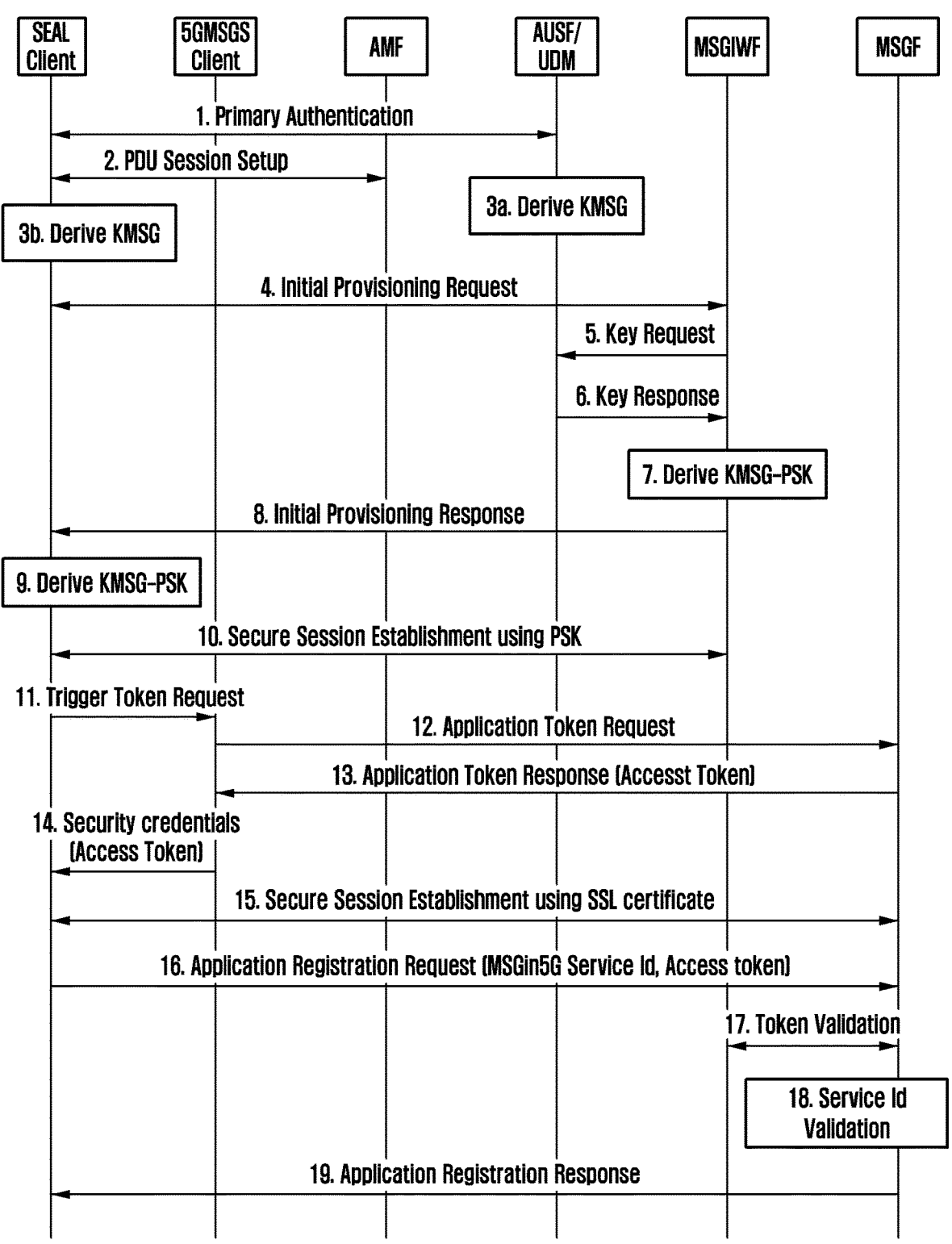

FIG. 9 is a sequence diagram, illustrating a method of authentication and authorization in MSGin5G service where an interworking function is introduced to act as the key management server.

At 1, the UE (500) initiates the initial registration procedure as defined in TS 23.502 to get the 5G Core network access. At the end of the network access authentication procedure (Primary authentication and key agreement [TS 33.501, clause 6.1]), the UE (500) and the AUSF are in possession of the key $K_{AUSF}$. In an embodiment, the UE (500) and AMF performs the capability exchange procedure and agree upon the method of authentication for MSGin5G service using existing NAS procedure or during the PDU session/NAS context establishment.

In another embodiment, the UE (500) and the AMF performs a service capability exchange procedure at 2. In this procedure the UE (500) and AMF agree upon the method of authentication for MSGin5G service.

In an embodiment, the UE (500) sends the service capability exchange request to the AMF indicating the methods for authentication UE (500) may support and the AMF selects the methods to be used further. The AMF indicates the selected method to the UE (500) in service capability exchange response message.

At 4, the UE (500) initiate the Initial service provisioning procedure with the MSGIWF. The MSGIWF sends a key request to the designated authentication server at 5. The AUSF sends back the derived $K_{MSG}$ in the key response at 6. At 7, on receiving the $K_{MSG}$ key, the MSGIWF derives the pre-shared key ($K_{MSG-PSK}$) from $K_{MSG}$.

In another embodiment, the SEAL Server or the MSGIWF directly sends the key request to the AMF/SEAF. The AMF/SEAF derives the $K_{MSG}$ from the $K_{SEAF}$/$K_{AMF}$. The SEAL server/MSGIWF identifies the AMF using the 5G-GUTI that has the GAUMI, which uniquely identifies one AMF.

At 8, the MSGIWF sends the initial service provisioning response to the 5GMSGS client. At 9, on receiving the initial service provisioning response, the 5GMSGS client derives the $K_{MSG-PSK}$.

In another embodiment instead of initial provisioning procedure to establish a shared secret the UE (500)/SEAL client and the SEAL server may authenticate each other based on the shared key generated (as described in method A). The shared key is used as a master key to generate TLS session keys, and also as the proof of secret key possession as part of the authentication function. The usage of Pre-Shared Key Cipher suites for Transport Layer Security (TLS) is specified in the TLS profile given in TS 33.310, Annex E.

Method 'A': In an embodiment, the UE (500)/SEAL client contacts the SEAL server, it may indicate to the SEAL server that it supports PSK-based TLS by adding one or more PSK-based cipher suites to the ClientHellomessage. If the SEAL server is willing to establish the TLS tunnel using a PSK-based cipher suite, its selects one of the PSK-based cipher suites offered by the UE (500), and send the selected cipher suite to the UE (500) in the ServerHello message. The SEAL server sends the ServerKeyExchange message with a string "3GPP-MSG-TLS" used as PSK-identity hint to indicate MSG based keying is supported and TLS is supported for authentication.

In another embodiment the ServerKeyExchange message includes the PSK-identity hints for all supported authentication methods. The UE (500)/SEAL client then uses the MSG based keys as the shared secret to derive the further PSK keys. The UE (500)/SEAL client and the SEAL have established a TLS tunnel using a shared secret, and uses the application level communication through this tunnel.

On successful initial service provisioning procedure the 5GMSGS client and MSGIWF establishes a TLS session using pre-shared key $K_{MSG-PSK}$ at 10. On successful TLS session establishment the 5GMSGS client sends a trigger message to the SEAL client to trigger an access token request at 11. Accordingly, SEAL client sends an application token request to the MSGIWF at 12. The MSGIWF provides the SEAL client with an access token at 13. The acquired access token is shared with 5GMSGS client at 14. Before sending the access token for authorization to the MSGin5G server, the 5GMSGS client establishes a secure channel using certificates at 15. The 5GMSGS client sends the access token in an application registration request to the MSGin5G server along with the MSGin5G service ID at 16. The MSGIWF validates the received access token at 17 and the MSGin5G server validates the service request by validating the MSGin5G service ID at 18. On successful verification MSGin5G server sends the application registration response at 19.

Figure 10:
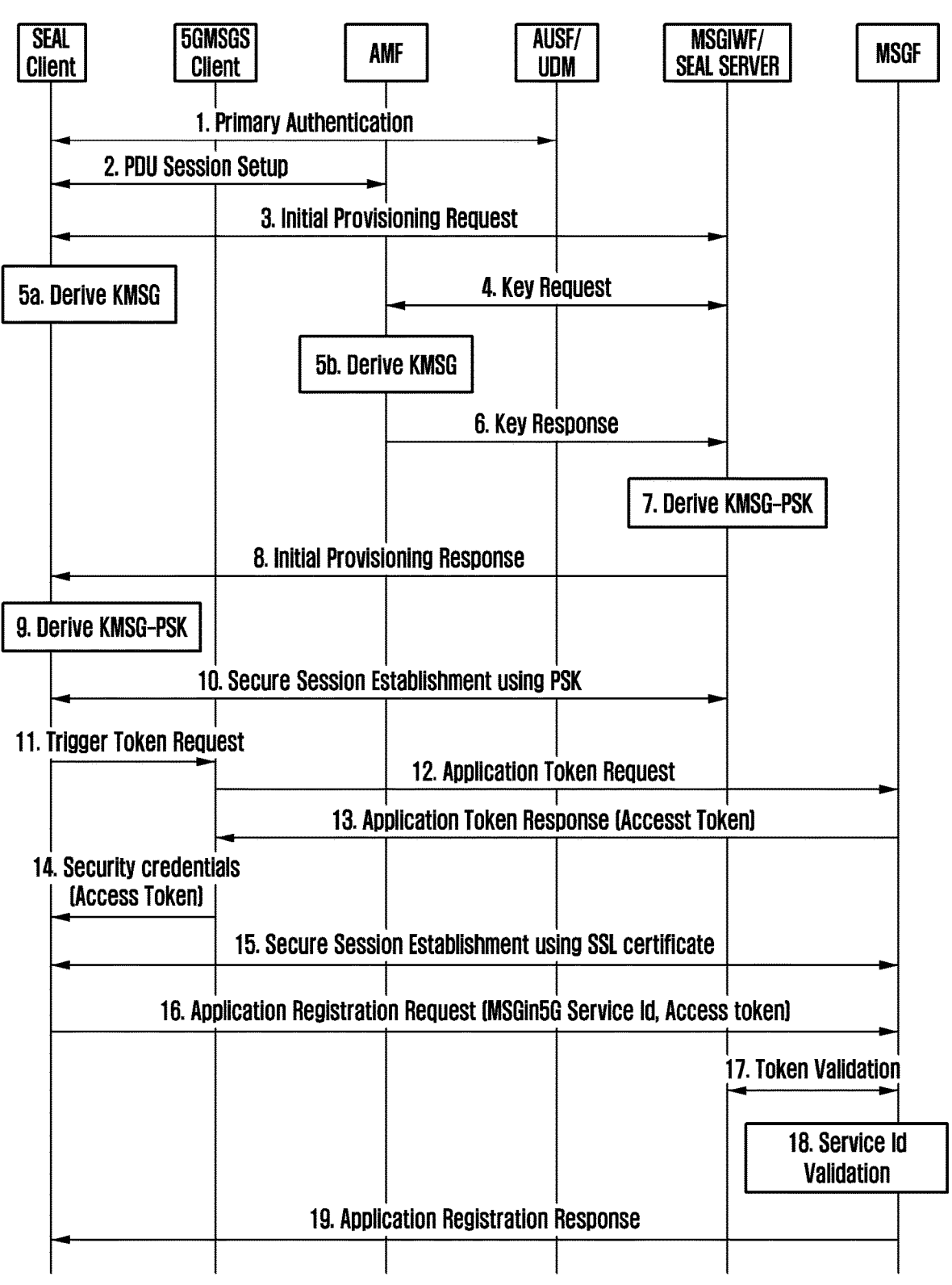
FIG. 10 is illustrating a scenario where the PSK based authentication and authorization mechanism for MSGin5G-1 interface is used, according to the embodiments as disclosed herein.

FIG. 10 is a sequence diagram, illustrating a method for authentication and authorization in MSGin5G service, in a scenario where the PSK based authentication and authorization mechanism for MSGin5G-1 interface is used, according to the embodiments as disclosed herein.

At 1, the UE (500) performs the procedures (for example, Initial Registration procedure) as defined in TS 23.502 to get the 5GC network access. At the end of the network access authentication procedure (Primary authentication and key agreement [TS 33.501, clause 6.1]), the UE (500) and the AMF are in possession of the key $K_{AMF}$ derived from $K_{SEAF}$.

In an embodiment, the UE (500) and the AMF performs the capability exchange procedure and agree upon the method of authentication for MSGin5G service using existing NAS procedure or during the PDU session/NAS context establishment at 2.

In another embodiment, the UE (500) and the AMF performs a service capability exchange procedure. In this procedure the UE (500) and AMF agree upon the method of authentication for MSGin5G service. In an embodiment, UE (500) sends the service capability exchange request to the AMF indicating the methods for authentication UE (500) may support and AMF selects the methods to be used further. AMF indicates the selected method to the UE (500) in service capability exchange response message.

The UE (500) initiate the Initial service provisioning procedure with the MSGIWF/SEAL server at 3. The MSGIWF/SEAL server sends a key request to the designated AMF at 4.

The UE (500) derives the $K_{MSG}$ key at 5a and optionally the further keys ($K_{MSG-IWF}$/$K_{MSG}$-SEAL) for MSGin5G service, whenever there is trigger to get MSG service. Key derivation step is skipped, if the UE (500) holds a valid $K_{MSG-IWF}$/$K_{MSG}$-SEAL.

In an embodiment, based on the UE (500)'s capability to support MSGin5G service, the SEAF/AMF derives the $K_{MSG}$ at 5b. After key material ($K_{MSG}$) is generated, the SEAF/AMF sends the generated $K_{MSG}$ and ngKSI to the MSGIWF together with UE (500) ID and/or SUPI and/or MSGin5G service ID of the 5GMSGS client in the key response at 6. The MSGIWF/SEAL server stores the latest information sent by the SEAF/AMF at 7. Once $K_{MSG-IWF}$/$K_{MSG-SEAL}$ is established, PSK is generated from $K_{MSG-IWF}$/$K_{MSG-SEAL}$ or $K_{MSG-IWF}$/$K_{MSG-SEAL}$ itself is used as the PSK).

In another embodiment, $K_{MSK-PSK}$ is generated directly from $K_{MSG}$. MSGIWF/SEAL server sends the initial service provisioning response to the 5GMSGS client at 8. On receiving the initial service provisioning response, the 5GMSGS client derives the $K_{MSG-PSK}$ at 9. On successful initial service provisioning procedure, the 5GMSGS client and MSGIWF establishes a TLS session using pre-shared key $K_{MSG-PSK}$ at 10.

In another embodiment instead of initial provisioning procedure to establish a shared secret the UE (500)/SEAL client and the SEAL server may authenticate each other based on the shared key generated (as described in method A). The shared key is used as a master key to generate TLS session keys, and also as the proof of secret key possession as part of the authentication function. The usage of Pre-Shared Key Cipher suites for Transport Layer Security (TLS) is specified in the TLS profile given in TS 33.310, Annex E.

Method 'A': In an embodiment, the UE (500)/SEAL client contacts the SEAL server, it may indicate to the SEAL server that it supports PSK-based TLS by adding one or more PSK-based cipher suites to the ClientHello message. If the SEAL server is willing to establish a TLS tunnel using a PSK-based cipher suite, its selects one of the PSK-based cipher suites offered by the UE (500), and send the selected cipher suite to the UE (500) in the ServerHello message. The SEAL server sends the ServerKeyExchange message with a string "3GPP-MSG-TLS" used as PSK-identity hint to indicate MSG based keying is supported and TLS is supported for authentication.

In another embodiment the ServerKeyExchange message includes the PSK-identity hints for all supported authentication methods. The UE (500)/SEAL client then uses the MSG based keys as the shared secret to derive the further PSK keys. The UE (500)/SEAL client and the SEAL have established a TLS tunnel using a shared secret, and uses the application level communication through this tunnel.

On successful TLS session establishment the 5GMSGS client sends a trigger message to the SEAL client to trigger an access token request at 11. Accordingly, the SEAL client sends an application token request to the MSGIWF/SEAL server at 12. The MSGIWF/SEAL server provides the SEAL client with an access token at 13. The acquired access token is shared with 5GMSGS client at 14.

Before sending the access token for authorization to the MSGin5G server, the 5GMSGS client establishes a secure channel using certificates at 15.

The 5GMSGS client sends the access token in an application registration request to the MSGin5G server along with the MSGin5G service ID at 16.

The MSGIWF/SEAL server validates the received access token at 17 and the MSGin5G server validates the service request by validating the MSGin5G service ID at 18. On successful verification MSGin5G server sends the application registration response at 19.

Figure 11:
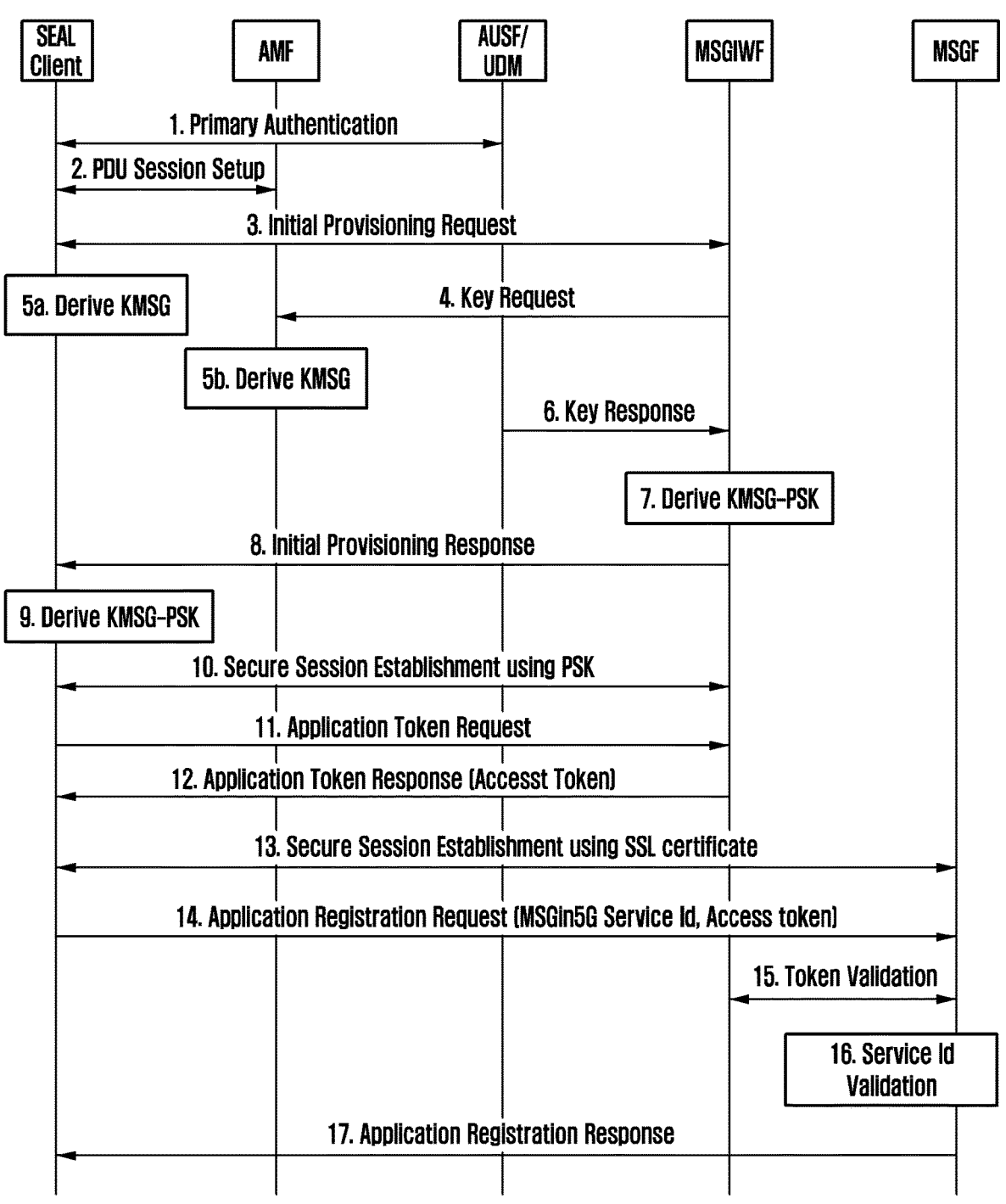
FIG. 11 is illustrating a scenario of MSGin5G service without SEAL enabler support, according to the embodiments as disclosed herein.

FIG. 11 is a sequence diagram, illustrating a method of authentication and authorization in MSGin5G service 10 is illustrating a scenario of MSGin5G service without SEAL enabler, according to the embodiments as disclosed herein.

The UE (500) performs the procedures (for example, Initial Registration procedure) as defined in TS 23.502 to get the 5GC network access at 1. At the end of the network access authentication procedure (Primary authentication and key agreement [TS 33.501, clause 6.1]), the UE (500) and the AMF are in possession of the key $K_{AMF}$ derived from $K_{SEAF}$.

In an embodiment, UE (500) and AMF performs the capability exchange procedure and agree upon the method of authentication for MSGin5G service using existing NAS procedure or during the PDU session/NAS context establishment at 2.

In another embodiment, the UE (500) and the AMF performs the service capability exchange procedure. In this procedure the UE (500) and the AMF agree upon the method of authentication for MSGin5G service. In an embodiment, the UE (500) sends the service capability exchange request to the AMF indicating the methods for authentication of the UE (500) may support and the AMF selects the methods to be used further. The AMF indicates the selected method to the UE (500) in service capability exchange response message.

At 3, the UE (500) initiate the Initial service provisioning procedure with the MSGIWF.

In an embodiment a SEAL client can be collocated in MSGin5G Client. Therefore, both "SEAL client" and "MSGin5G client" refers to same network entity in this invention.

In an embodiment a SEAL server can be collocated in MSGin5G Server. Therefore, both "SEAL server" and "MSGin5G server" refers to same network entity in this invention.

At 4, the MSGIWF sends a key request to the designated AMF. In an embodiment, the SEAL Server or the MSGIWF directly sends the key request to the AMF/SEAF. The AMF/SEAF derives the $K_{MSG}$ from the $K_{SEAF}$/$K_{AMF}$ at 5b. The SEAL server/MSGIWF identifies the AMF using the 5G-GUTI that has the GAUMI, which uniquely identifies the AMF.

The UE (500) derives the $K_{MSG}$ key at 5a and optionally the further keys ($K_{MSG-IWF}$) for MSGin5G service, whenever there is trigger to get MSG service. Key derivation step is skipped, if the UE (500) holds a valid $K_{MSG-IWF}$.

In an embodiment, based on the UE (500)'s capability to support the MSGin5G service, the SEAF/AMF derives the $K_{MSG}$. After the key material ($K_{MSG}$) is generated, the SEAF/AMF sends the generated $K_{MSG}$ and ngKSI to the MSGIWF together with the UE (500) ID and/or SUPI and/or MSGin5G service ID of the 5GMSGS client in the key response at 6. The MSGIWF stores the latest information sent by the SEAF/AMF.

Once the $K_{MSG-IWF}$ is established, the PSK is generated from $K_{MSG-IWF}$ or $K_{MSG-IWF}$ itself is used as the PSK at 7. The MSGIWF sends the initial service provisioning response to the 5GMSGS client at 8. On receiving the initial service provisioning response, the 5GMSGS client derives the $K_{MSG-PSK}$ at 9. On successful initial service provisioning procedure, the 5GMSGS client and the MSGIWF establishes the TLS session using pre-shared key $K_{MSG-PSK}$ at 10.

In another embodiment instead of initial provisioning procedure to establish a shared secret the UE (500) and the MSGIWF may authenticate each other based on the shared key generated (as described in method A). The shared key is used as a master key to generate TLS session keys, and also as the proof of secret key possession as part of the authentication function. The usage of Pre-Shared Key Cipher suites for Transport Layer Security (TLS) is specified in the TLS profile given in TS 33.310, Annex E.

Method 'A': In an embodiment, the UE (500) contacts the MSGIWF, it may indicate to the MSGIWF that it supports PSK-based TLS by adding one or more PSK-based cipher suites to the ClientHello message. If the MSGIWF is willing to establish a TLS tunnel using a PSK-based cipher suite, its selects one of the PSK-based cipher suites offered by the UE (500), and send the selected cipher suite to the UE (500) in the ServerHello message. The MSGIWF sends the ServerKeyExchange message with a string "3GPP-MSG-TLS" used as PSK-identity hint to indicate MSG based keying is supported and TLS is supported for authentication.

In another embodiment the ServerKeyExchange message includes the PSK-identity hints for all supported authentication methods. The UE (500) then uses the MSG based keys as the shared secret to derive the further PSK keys. The UE (500) and the MSGIWF have established a TLS tunnel using a shared secret, and uses the application level communication through this tunnel.

On successful TLS session establishment the 5GMSGS client sends an application token request to the MSGIWF at 11. The MSGIWF provides the access token to the 5GMSGS client at 12. Before sending the access token for authorization to the MSGin5G server, the 5GMSGS client establishes a secure channel using certificates at 13.

The 5GMSGS client sends the access token in an application registration request to the MSGin5G server along with the MSGin5G service ID at 14. The MSGIWF validates the received access token at 15 and the MSGin5G server validates the service request by validating the MSGin5G service ID at 16. On successful verification MSGin5G server sends the application registration response at 17.

Figure 12:
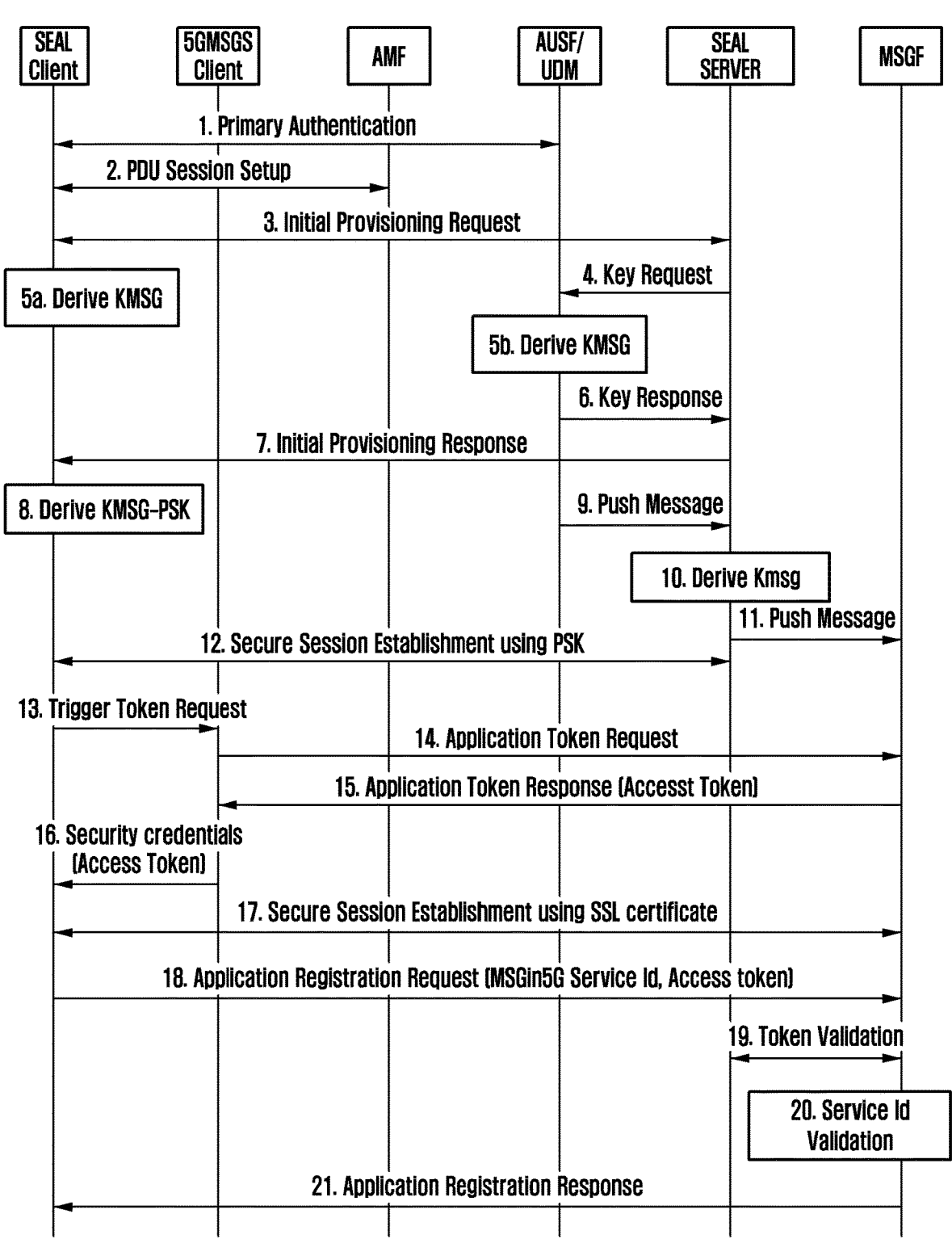
FIG. 12 is illustrating a scenario of authentication and authorization procedure between UE and MSGin5G server, according to the embodiments as disclosed herein.

FIG. 12 is a sequence diagram, illustrating a method of authentication and authorization in MSGin5G service in a scenario, according to the embodiments as disclosed herein.

In an embodiment, the current method differs from other alternatives as enclosed in other embodiment in a way that $K_{MSG}$ is used as the PSK secret between the UE (500) and the SEAL server. This PSK ($K_{MSG}$) is used to establish an IKEv2 tunnel. Further application related messages are exchanged via IKEv2 tunnel for getting the access token.

In an embodiment, the $K_{MSG-PSK}$ is another PSK secret derived from the $K_{MSG}$ used between the UE (500) and the MSGin5G server for establishing the IKEv2 tunnel. Further application related messages are exchanged via the IKEv2 tunnel for validation of the access token for authorization.

Figure 13:
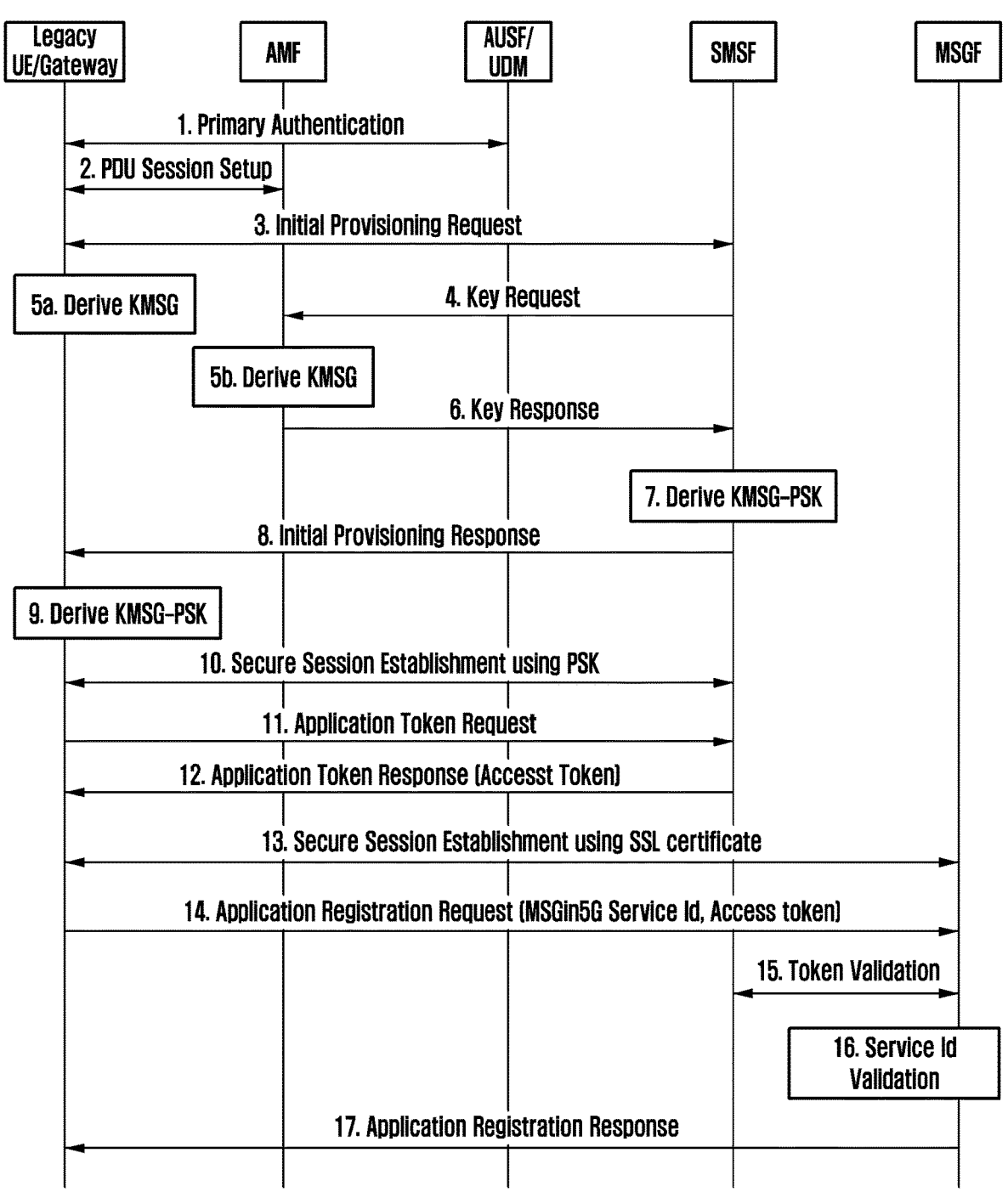
FIG. 13 is illustrating a scenario where the SMS function is enhanced to act as the key management server for legacy UEs, according to the embodiments as disclosed herein.

FIG. 13 is a sequence diagram, illustrating the method for authentication and authorization in the MSGin5G service in a scenario where the SMS function is enhanced to act as the key management server, according to the embodiments as disclosed herein.

The UE (500) here in the present scenario refers to the legacy 3GPP UE (500) or the legacy 3GPP gateway. Based on a SA2 specification the TR 23.700-24, the Service ID in legacy UE (500) is translated as the MSGin5G service ID.

At 1, the UE (500) initiates the initial registration procedure as defined in TS 23.502 to get the 5G Core network access. At the end of the network access authentication procedure (Primary authentication and key agreement [TS 33.501, clause 6.1]), the UE (500) and the AUSF are in possession of the key $K_{AUSF}$.

In an embodiment, the UE (500) and the AMF performs the capability exchange procedure and agree upon the method of authentication for MSGin5G service using existing NAS procedure or during the PDU session/NAS context establishment.

In another embodiment, the UE (500) and the AMF performs a service capability exchange procedure. In this procedure the UE (500) and the AMF agree upon the method of authentication for the MSGin5G service.

In an embodiment, the UE (500) sends the service capability exchange request to the AMF indicating the methods for authentication UE (500) may support and AMF selects the methods to be used further. AMF indicates the selected method to the UE (500) in service capability exchange response message.

The UE (500) initiate the Initial service provisioning procedure with the SMS function which acts as the key management server at 3. The SMS function sends a key request to the designated AUSF at 4. The AUSF derives the MSGin5G service key ($K_{MSG}$) from $K_{AUSF}$ at 5b. Alternatively, the EMSK is the $K_{AUSF}$ and MSK is the $K_{MSG}$. The AUSF sends back the derived $K_{MSG}$ in the key response at 6.

The SMS function derives the pre-shared key $K_{MSG-PSK}$ from $K_{MSG}$ at 7 and sends the initial service provisioning response to the UE (500) at 8. On receiving the initial service provisioning response, the UE (500) derives the $K_{MSG-PSK}$ at 9. Upon successful initial service provisioning procedure the UE (500) and SMSF establishes a TLS session using preshared key $K_{MSG-PSK}$ at 10.

In another embodiment instead of initial provisioning procedure to establish a shared secret the UE (500)/SEAL client and SEAL server may authenticate each other based on the shared key generated (as described in method A). The shared key is used as a master key to generate TLS session keys, and also as the proof of secret key possession as part of the authentication function. The usage of Pre-Shared Key Cipher suites for Transport Layer Security (TLS) is specified in the TLS profile given in TS 33.310, Annex E.

Method 'A': In an embodiment, the UE (500)/SEAL client contacts the SEAL server, it may indicate to the SEAL server that it supports PSK-based TLS by adding one or more PSK-based cipher suites to the ClientHello message. If the SEAL server is willing to establish a TLS tunnel using a PSK-based cipher suite, its selects one of the PSK-based cipher suites offered by the UE (500), and send the selected cipher suite to the UE (500) in the ServerHello message. The SEAL server sends the ServerKeyExchange message with a string "3GPP-MSG-TLS" used as PSK-identity hint to indicate MSG based keying is supported and TLS is supported for authentication.

In another embodiment the ServerKeyExchange message includes the PSK-identity hints for all supported authentication methods. The UE (500) then uses the MSG based keys as the shared secret to derive the further PSK keys. The UE (500) and the SEAL server have established a TLS tunnel using a shared secret, and uses the application level communication through this tunnel.

On successful TLS session establishment the UE (500) sends an application token request to the SMSF at 11. The SMSF provides the UE (500) with an access token at 12. Before sending the access token for authorization to the MSGin5G server, the UE (500) establishes a secure channel using certificates at 13.

The UE (500) sends the access token in an application registration request to the MSGin5G server along with the MSGin5G service ID at 14. The SMSF validates the received access token at 15 and the MSGin5G server validates the service request by validating the MSGin5G service ID at 16. On successful verification MSGin5G server sends the application registration response at 17.

Figure 14:
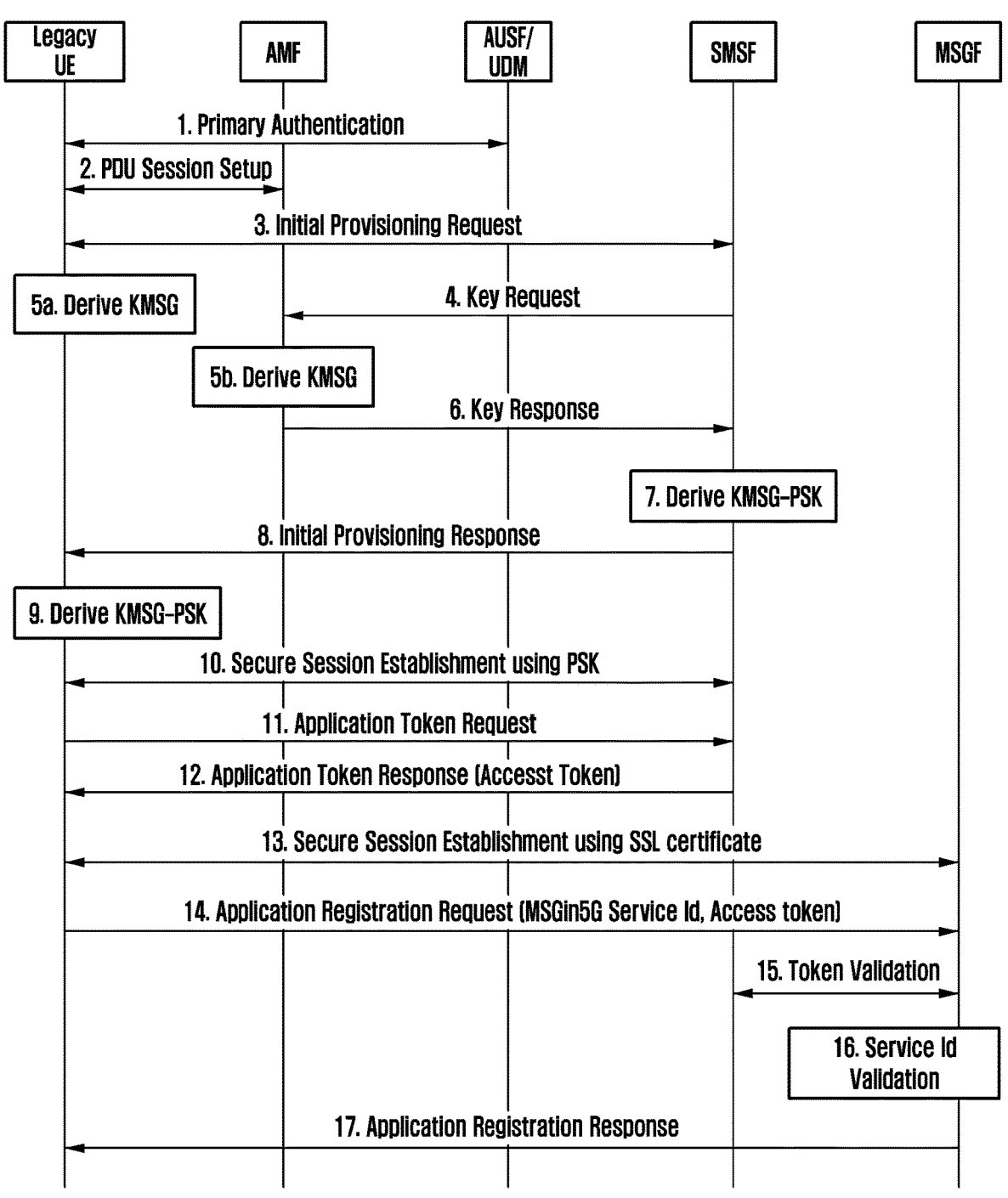
FIG. 14 is illustrating a scenario of MSGin5G service for the legacy UEs, according to the embodiments as disclosed herein.

FIG. 14 is a sequence diagram, illustrating a scenario of MSGin5G service for the legacy UE (500), according to the embodiments as disclosed herein.

In the present embodiment, the PSK or key to derive PSK is obtained from SMSF. At 1, the UE (500) performs the procedures (for example, Initial Registration procedure) as defined in TS 23.502 to get the 5GC network access. At the end of the network access authentication procedure (Primary authentication and key agreement [TS 33.501, clause 6.1]), the UE (500) and the AMF are in possession of the key $K_{AMF}$ derived from $K_{SEAF}$.

In an embodiment, the UE (500) and the AMF performs the capability exchange procedure and agree upon the method of authentication for MSGin5G service using existing NAS procedure or during the PDU session/NAS context establishment at 2.

In another embodiment, the UE (500) and the AMF performs a service capability exchange procedure. In this procedure the UE (500) and the AMF agree upon the method of authentication for the MSGin5G service. In an embodiment, the UE (500) sends the service capability exchange request to the AMF indicating the methods for authentication of the UE (500) may support and the AMF selects the methods to be used further. The AMF indicates the selected method to the UE (500) in service capability exchange response message.

The UE (500) initiate the Initial service provisioning procedure with the SMSF at 3. The SMSF sends a key request to the designated AMF at 4. The AMF/SEAF derives the $K_{MSG}$ from the $K_{SEAF}/K_{AMF}$ at 5b. The SMSF identifies the AMF using the 5G-GUTI that has the GAUMI, which uniquely identifies one AMF. The UE (500) derives the $K_{MSG}$ key at 5a and optionally the further keys ($K_{MSG}$-SMS) for MSGin5G service, whenever there is trigger to get MSG service. Key derivation step is skipped, if the UE (500) holds a valid $K_{MSG}$-SMS.

In an embodiment, based on the UE (500)'s capability to support the MSGin5G service, the SEAF/AMF derives the $K_{MSG}$. After key material ($K_{MSG}$) is generated, the SEAF/ AMF sends the generated $K_{MSG}$ and ngKSI to the SMSF together with UE (500) ID and/or SUPI and/or MSGin5G service ID of the 5GMSGS client in the key response at 6. The SMSF stores the latest information sent by the SEAF/ AMF. Once $K_{MSG}$-SMS is established, PSK is generated from $K_{MSG}$-SMS or $K_{MSG}$-SMS itself is used as the PSK at 7.

The SMSF sends the initial service provisioning response to the 5GMSGS client at 8. On receiving the initial service provisioning response, the 5GMSGS client derives the $K_{MSG-PSK}$ at 9. On successful initial service provisioning procedure, the 5GMSGS client and SMSF establishes a TLS session using pre-shared key $K_{MSG-PSK}$ at 10.

In another embodiment instead of initial provisioning procedure to establish a shared secret the UE (500) and SMSF may authenticate each other based on the shared key generated (as described in method A). The shared key is used as a master key to generate TLS session keys, and also as the proof of secret key possession as part of the authentication function. The usage of Pre-Shared Key Cipher suites for Transport Layer Security (TLS) is specified in the TLS profile given in TS 33.310, Annex E.

Method 'A': In an embodiment, the UE (500) contacts a SMSF, it may indicate to the SMSF that it supports PSK-based TLS by adding one or more PSK-based cipher suites to the ClientHello message. If the SMSF is willing to establish a TLS tunnel using a PSK-based cipher suite, its selects one of the PSK-based cipher suites offered by the UE (500), and send the selected cipher suite to the UE (500) in the ServerHello message. The SMSF sends the Server-KeyExchange message with a string "3GPP-MSG-TLS" used as PSK-identity hint to indicate MSG based keying is supported and TLS is supported for authentication.

In another embodiment the ServerKeyExchange message includes the PSK-identity hints for all supported authentication methods. The UE (500) then uses the MSG based keys as the shared secret to derive the further PSK keys. The UE (500) and the SMSF have established a TLS tunnel using a shared secret, and uses the application level communication through this tunnel.

On successful TLS session establishment the 5GMSGS client sends an application token request to the SMSF at 11. SMSF provides the access token to the 5GMSGS client at 12. Before sending the access token for authorization to the MSGin5G server, the 5GMSGS client establishes a secure channel using certificates at 13.

The 5GMSGS client sends the access token in an application registration request to the MSGin5G server along with the MSGin5G service ID at 14.

The SMSF validates the received access token at 15 and the MSGin5G server validates the service request by validating the MSGin5G service ID at 16. On successful verification MSGin5G server sends the application registration response at 17.

Figure 15:
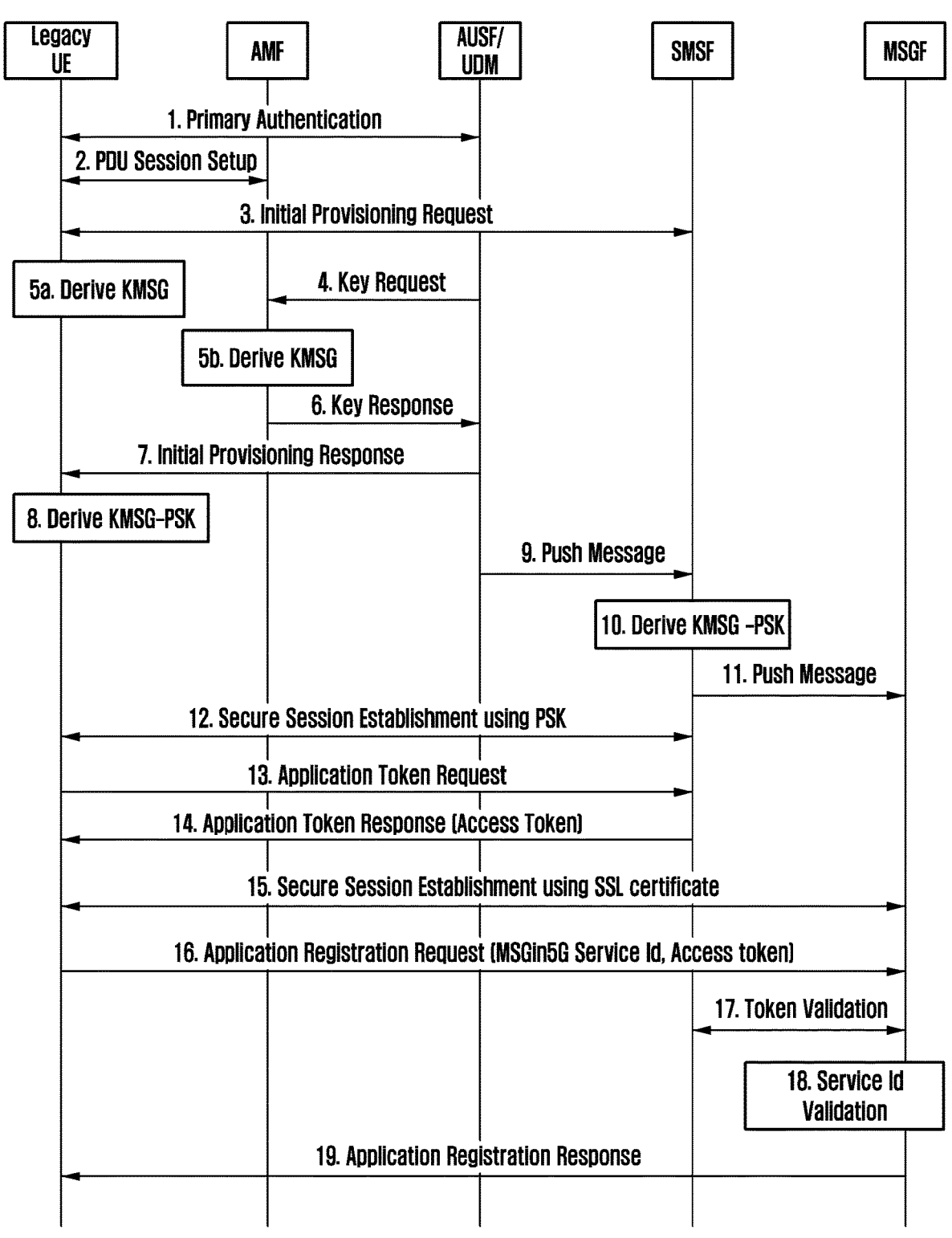
FIG. 15 is illustrating a scenario of authentication and authorization procedure between legacy UE and MSGin5G server, according to the embodiments as disclosed herein.

FIG. 15 is a sequence diagram, illustrating a method of authentication and authorization procedure between the legacy UE (500) and MSGin5G server, according to the embodiments as disclosed herein.

In an embodiment, the procedure differs from other alternatives as enclosed in other embodiment here in a way that $K_{MSG}$ is used as the PSK secret between the UE (500) and the SMSF. This PSK ($K_{MSG}$) is used to establish an IKEv2 tunnel. Further application related messages are exchanged via IKEv2 tunnel for getting the access token.

In an embodiment, the $K_{MSG-PSK}$ is another PSK secret derived from $K_{MSG}$ used between the UE (500) and the MSGin5G server for establishing IKEv2 tunnel. Further application related messages are exchanged via IKEv2 tunnel for validation of the access token for authorization.

Figure 16:
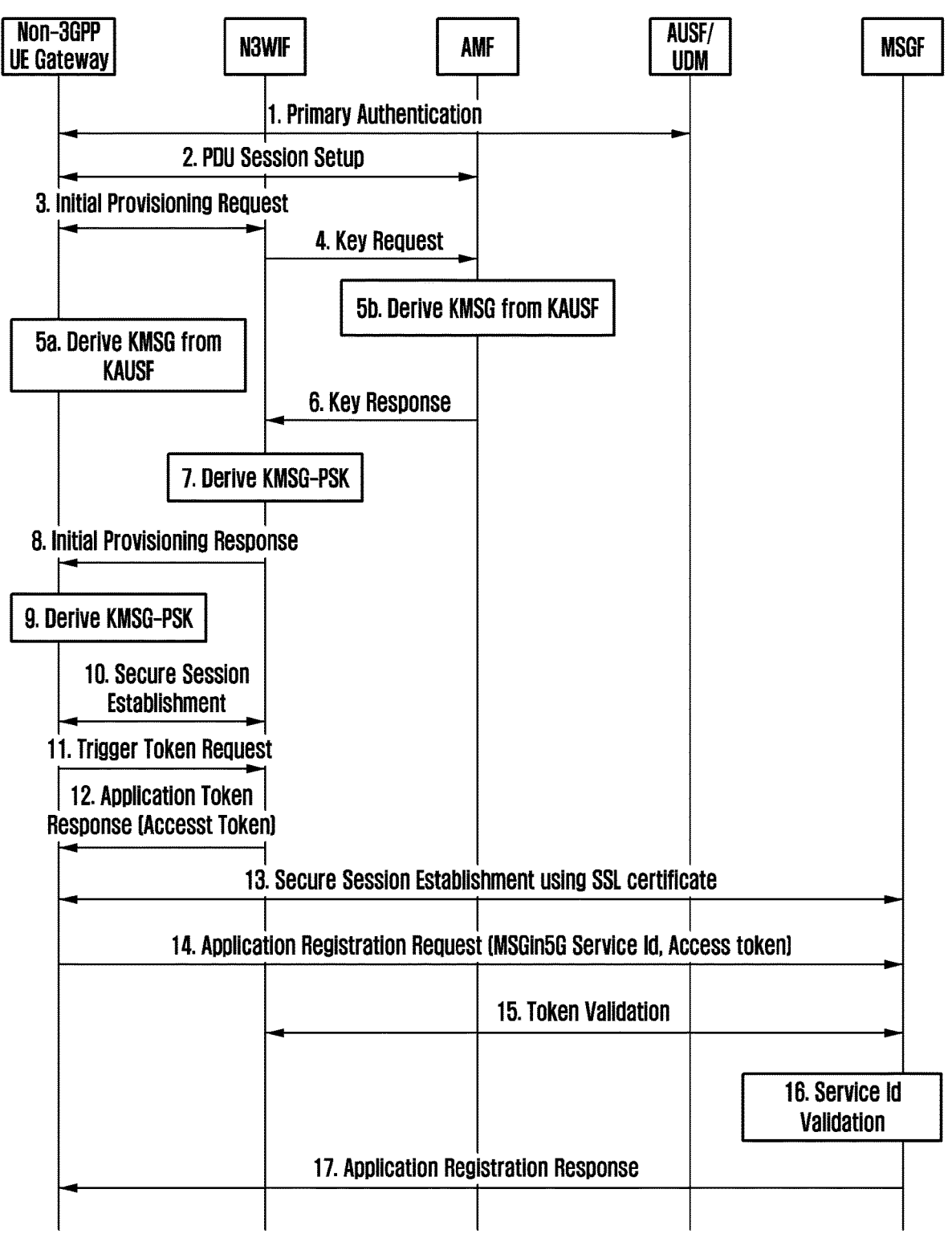
FIG. 16 is illustrating a scenario where a Non-3GPP interworking function is enhanced to act as the key management server for non-3GPP UEs, according to the embodiments as disclosed herein.

FIG. 16 is a schematic diagram, illustrating a scenario where a Non-3GPP interworking function is enhanced to act as the key management server for authentication and authorization in the MSGin5G server, according to the embodiments as disclosed herein.

The UE (500) here in the present embodiment refers to the non-3GPP UE (500) or the non-3GPP gateway. Based on SA2 specification the TR 23.700-24, the Service ID in non-3GPP UE (500) is translated as the MSGin5G service ID.

At 1, the UE (500) initiates the initial registration procedure as defined in TS 23.502 to get the 5G Core network access. At the end of the network access authentication procedure (Primary authentication and key agreement [TS 33.501, clause 6.1]), the UE (500) and the AUSF are in possession of the key $K_{AUSF}$.

In an embodiment, the UE (500) and the AMF performs the capability exchange procedure and agree upon the method of authentication for MSGin5G service using existing NAS procedure or during the PDU session/NAS context establishment at 2.

In another embodiment, the UE (500) and the AMF performs a service capability exchange procedure. In this procedure the UE (500) and AMF agree upon the method of authentication for MSGin5G service.

In an embodiment, the UE (500) sends the service capability exchange request to the AMF indicating the methods for authentication UE (500) may support and AMF selects the methods to be used further. The MF indicates the selected method to the UE (500) in service capability exchange response message.

At 3, the UE (500) initiate the Initial service provisioning procedure with the N3IWF which acts as the key management server.

In an embodiment, the MSGin5G service Key $K_{MSG}$ is derived from $K_{N3IWF}$. Alternatively, the $K_{MSG-PSK}$ is directly derived from the $K_{N3IWF}$. The N3IWF sends a key request to the designated AMF at 4. The AMF derives the MSGin5G service key ($K_{MSG}$) from $K_{AMF}$/$K_{SEAF}$ at 5b. The AMF sends back the derived $K_{MSG}$ in the key response at 6. The N3IWF derives the pre-shared key $K_{MSG-PSK}$ from $K_{MSG}$ at 7 and sends the initial service provisioning response to the UE (500) at 8. On receiving the initial service provisioning response, the UE (500) derives the $K_{MSG-PSK}$ at 9.

On successful initial service provisioning procedure the UE (500) and N3IWF establishes a TLS session using pre-shared key $K_{MSG-PSK}$ at 10. On successful TLS session establishment the UE (500) sends an application token request to the N3IWF at 11. N3IWF provides the UE (500) with an access token at 12.

Before sending the access token for authorization to the MSGin5G server, the UE (500) establishes a secure channel using certificates at 13. The UE (500) sends the access token in an application registration request to the MSGin5G server along with the MSGin5G service ID at 14.

The N3IWF validates the received access token at 15 and the MSGin5G server validates the service request by validating the MSGin5G service ID at 16. On successful verification MSGin5G server sends the application registration response at 17.

Figure 17:
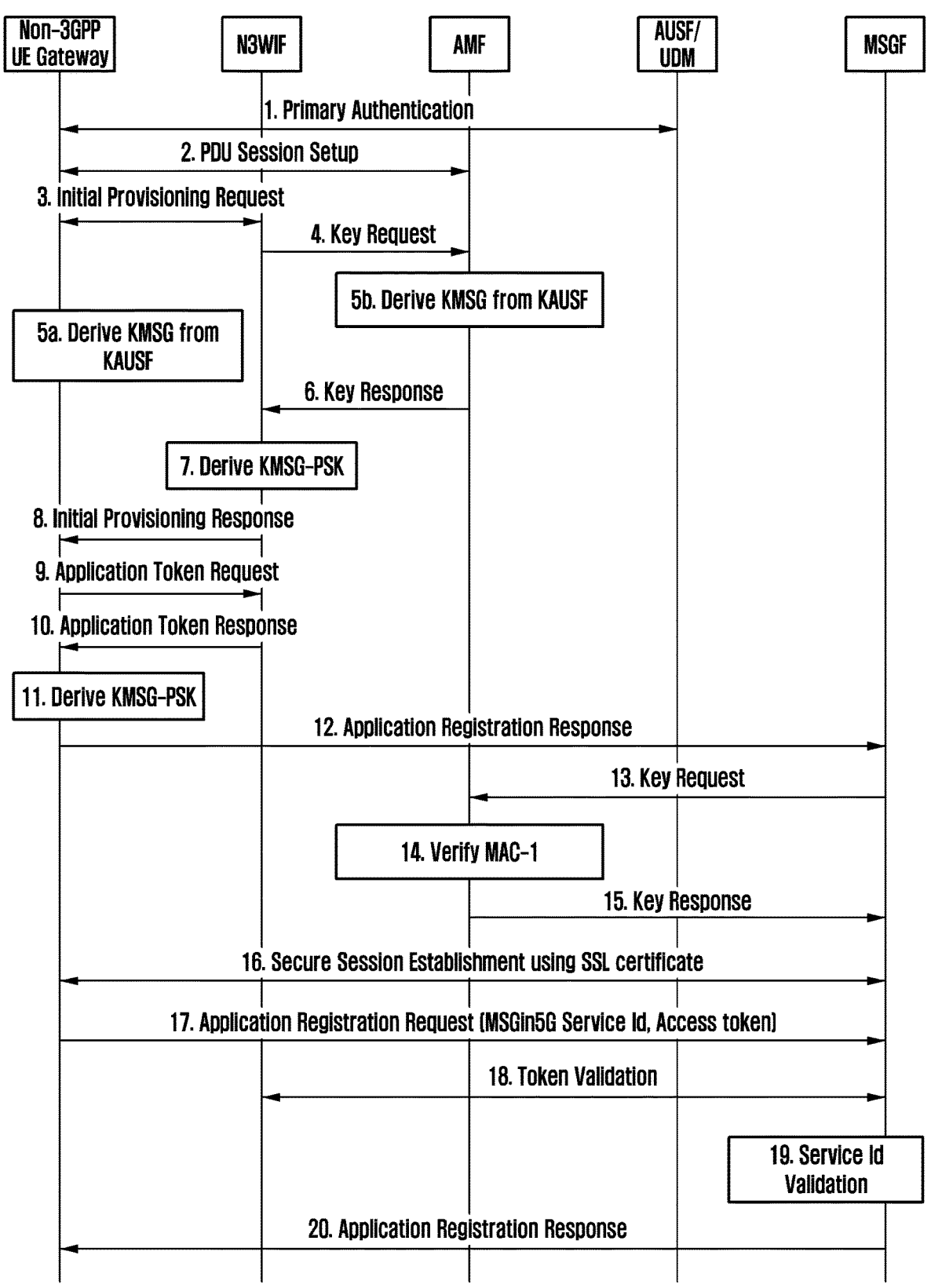
FIG. 17 is illustrating a scenario where authentication and authorization between non-3GPP UE and the MSGin5G server, according to the embodiments as disclosed herein.

FIG. 17 is a sequence diagram, illustrating a scenario where authentication and authorization between non-3GPP UE (500) and the MSGin5G server, according to the embodiments as disclosed herein.

In the present embodiment, the $K_{N3IWF}$ is used to establish an IKEv2 tunnel between Non-3GPP UE (500) and the N3IWF. The access token is obtained by UE (500) via IKEv2 tunnel. At step 11 to 14 the UE (500) sends application registration request to the MSGin5G server with AMF ID and MAC-I$_{MSG}$. The MSGin5G server sends the key request to the designated AMF (identifies the AMF using AMF ID).

In another embodiment, the AMF verifies the MAC-I$_{MSG}$ using stored MSG service context ($K_{N3IWF}$) and derives $K_{MSG-PSK}$ using which the UE (500) and MSGF establishes another IKEv2 tunnel. Further token validation is done via this IKEv2 tunnel for authorization purpose.

Figure 18:
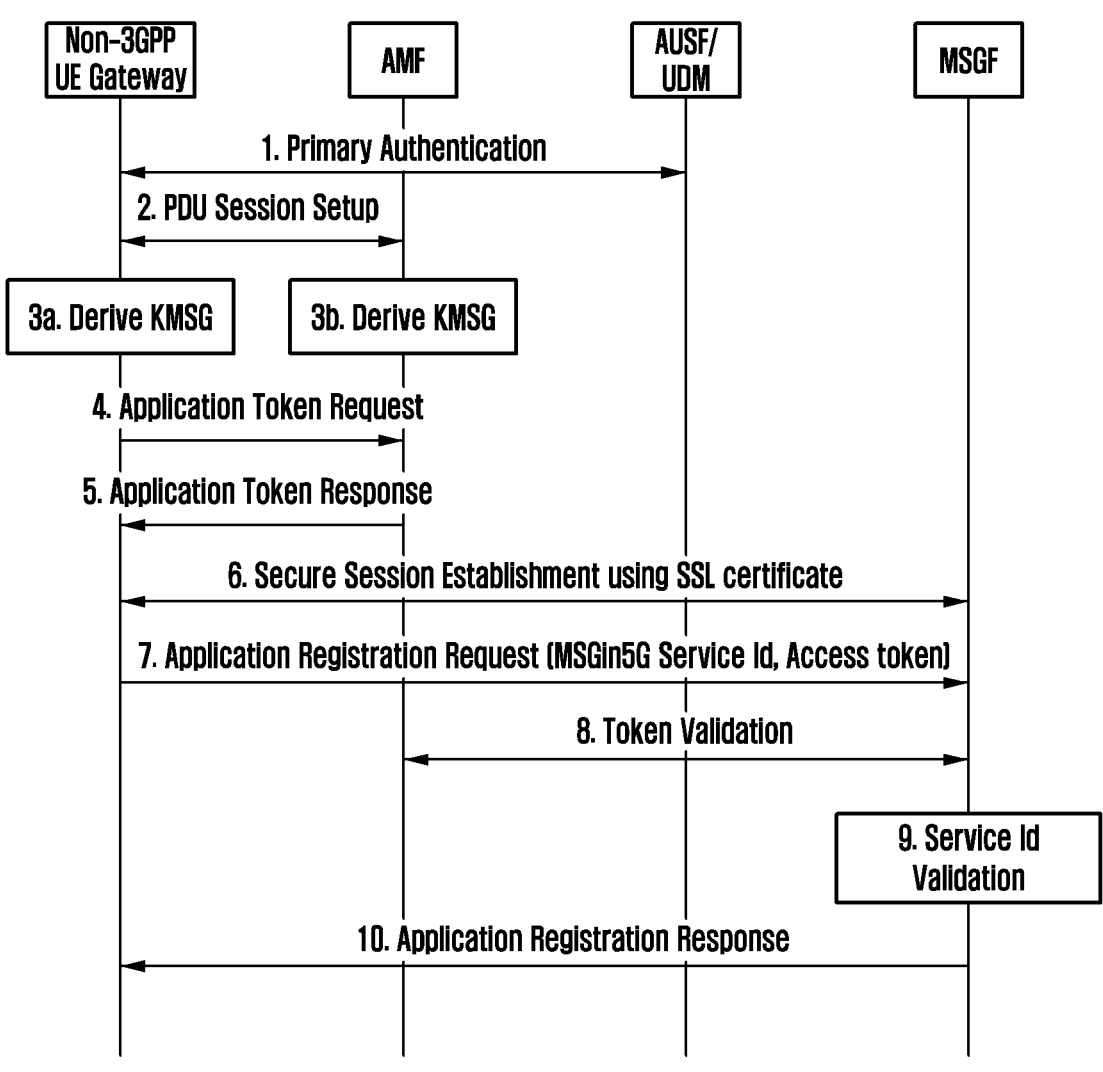
FIG. 18 is illustrating a method for authentication and authorization between UE (5GMSGS UE/legacy UE/Non-3gpp UE) and MSGF (MSGin5G server), according to the embodiments as disclosed herein.

FIG. 18 is a sequence diagram, illustrating a method for authentication and authorization between the UE (500) (5GMSGS UE (500)/legacy UE (500)/Non-3gpp UE (500)) and MSGF (MSGin5G server), according to the embodiments as disclosed herein.

In the AMF provides an access token to the UE (500) and this token used by the UE (500) for service authorization.

Figure 19:
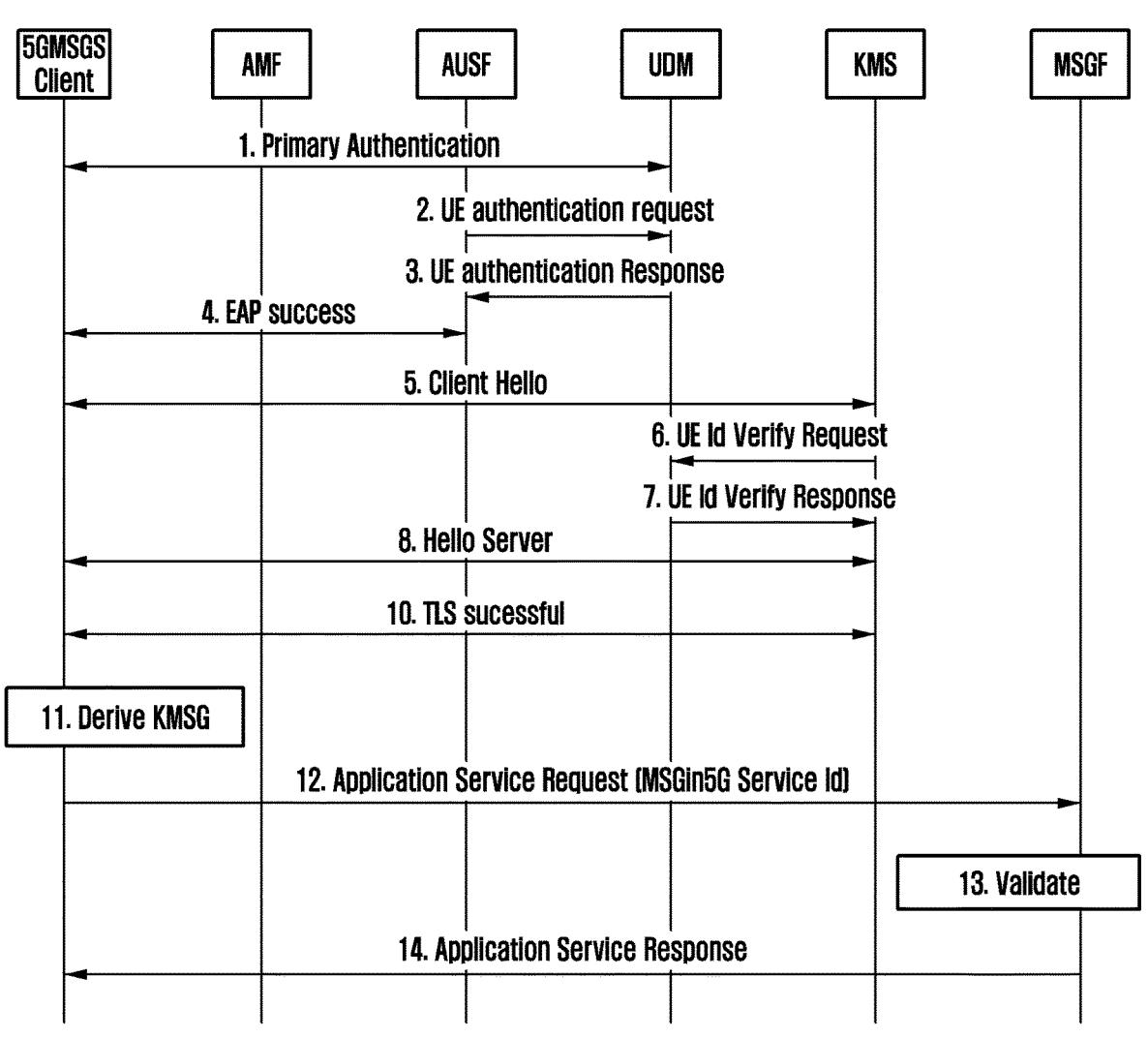
FIG. 19 is illustrating a method for authentication and authorization between UE (5GMSGS UE/legacy UE/Non-3gpp UE) and MSGF (MSGin5G server) using an independent key management server, according to the embodiments as disclosed herein.

FIG. 19 is a sequence diagram, illustrating a method for authentication and authorization of the MSGin5G server, where the key management server is separate and the PSK is independent of the EAP procedure performed between UE (500) and network.

In an embodiment the, UE (500) sends the service indication to the network during the primary authentication. Service indication (Service_Indc) indicates that the UE (500) supports MSGin5G service. This procedure could be used to established pre-shared secret for any services for example, EDGE, V2X, MSG, thus the indication is used to indicate the service for which the pre-shared key is to be established.

In an embodiment, the network provides the KMS address to the UE (500). The KMS address may be in the form of a URI which is required to identify the designated key management server.

The UE (500) and KMS performs TLS handshake to get the pre-shared secret from which a pre-shared key is derived to establish a secure session between UE (500) and the MSGin5G server. In an embodiment, the pre-shared key is a SEED KEY from which $K_{MSG\text{-}PSK}$ is derived for TLS-PSK.

In another embodiment, a SEED KEY itself may be uses as PSK to establish a secure TLS.

Figure 20:
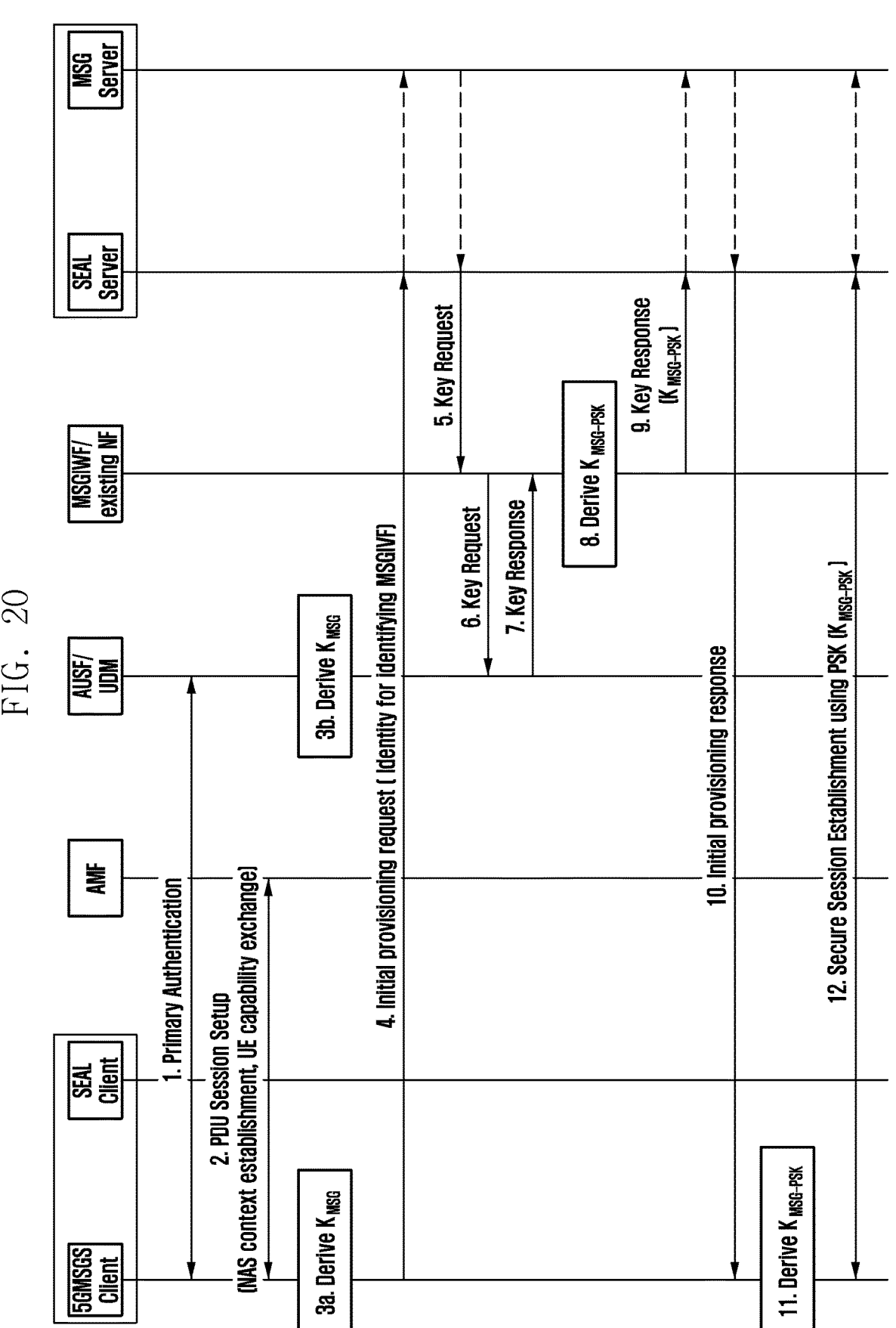
FIG. 20 is a sequence diagram, illustrating a procedure combining various alternatives, where the AUSF acts as the key management server for authentication and authorization in the MSGin5G service, according to the embodiments as disclosed herein.

FIG. 20 is a sequence diagram, illustrating a procedure which combines various alternatives, where the AUSF acts as the key management server for authentication and authorization in the MSGin5G service, according to the embodiments as disclosed herein.

In an embodiment, SEAL client can be collocated in MSGin5G Client. Therefore, both "SEAL client" and "MSGin5G client" refers to same network entity in this invention.

In an embodiment, SEAL server can be collocated in MSGin5G Server. Therefore, both "SEAL server" and "MSGin5G server" refers to same network entity in this invention.

At 1-3, the UE (500) initiates the initial registration procedure with the AUSF, as defined in TS 23.502 to get a 5G Core network access. At the end of the network access authentication procedure (Primary authentication and key agreement [TS 33.501, clause 6.1]), the UE (500) and the AUSF are in possession of AUSF key $K_{AUSF}$. On successful primary authentication the UE and the core network derives the $K_{MSG}$ from the $K_{AUSF}$.

In an embodiment, the AUSF receives an MSGin5G service indication from UDM. This indicates that the AUSF should derive a $K_{MSG}$ key from $K_{AUSF}$. In another embodiment, UE (500) subscription data includes the information on support of MSGin5G services.

At 4, MSGin5G client or SEAL client sends an initial provisioning request to the MSGin5G Server or SEAL server.

At 5, MSGin5G server or SEAL server sends a key request to the designated MSGin5G interworking function. In an embodiment, the SEAL server or MSGin5G server sends the MSGin5G UE (500) ID and/or MSGin5G service ID and/or UE (500) service ID. The MSGin5G interworking function verifies the request by verifying the UE specific ID. If authorized or verified successfully the MSGin5G interworking function forwards the key request to the AUSF.

In another embodiment, the authorization check is done at the AUSF by fetching and checking the UE subscription data from the UDM.

At 6-9, MSGin5G interworking function forwards the key request to the AUSF to fetch $K_{MSG}$. AUSF sends back the derived $K_{MSG}$ in the key response. On receiving the $K_{MSG}$ key, MSGIWF derives the pre-shared key ($K_{MSG\text{-}PSK}$) from $K_{MSG}$ and sends it to the SEAL server or MSGin5G Server.

At 10-11, SEAL server or MSGin5G server sends the initial service provisioning response to the 5GMSGS client. On receiving the initial service provisioning response, the 5GMSGS client derives the $K_{MSG\text{-}PSK}$.

In an embodiment, step 11 can happen immediately after step 3.

At 12, on successful initial service provisioning procedure the 5GMSGS client and SEAL server or MSGin5G server establishes a TLS session using pre-shared key $K_{MSG\text{-}PSK}$.

On successful TLS session establishment the 5GMSGS client is provided with an access token by SEAL server if deployed separately.

In another embodiment, the access token is issues by an authorization server hosted by the operator or third party.

In an embodiment, the 5GMSGS client sends the access token in an application registration request to the MSGin5G server along with the MSGin5G service ID.

SEAL server validates the received access token and the MSGin5G server validates the service request by validating the MSGin5G service ID. On successful verification MSGin5G server sends the application registration response.

In another embodiment, the MSGin5G server verifies the access token signature and verifies the claims in the access token.

Key derivation-Based on the above described alternatives below are the variants to derive the key for MSGin5G service and pre-shared MSGin5G keys for secure connection establishment. The serving network specific keys $K_{SEAF}$ or $K_{AMF}$ iS used for the MSGin5G service related key derivations. In an embodiment the SEAF and UE calculates the $K_{MSG}$ from the $K_{SEAF}$. In another embodiment, $K_{MSG}$ is calculated from the $K_{AMF}$.

Alternatively, the SEAF and the UE (500) calculates $K_{SEAF}$ from $K_{AUSF}$ as described in TS 33.501. The SEAF derives the $K_{MSG}$ from the $K_{SEAF}$, the ABBA parameter and the SUPI as detailed and provides the ng KSI and the $K_{MSG}$ to the MSGIWF or SEAL server or SMSF or N3IWF. Similarly, the UE (500) derives the $K_{MSG}$ from the $K_{SEAF}$, the ABBA parameter and the SUPI, in the same way as the SEAF.

In an embodiment, key for MSGIWF/SEAL server/SMSF/N3IWF for the MSG service $K_{MSG}$ is a key derived by ME and SEAF/AMF from $K_{SEAF}/K_{AMF}/K_{AUSF}/K_{N3IWF}$ for the MSG service it is stored and maintained at the AMF/SEAF/AUSF as the MSGin5G security context from which all the Pre-shared keys re derived.

Key for MSG Service $K_{MSG\text{-}IWF}/K_{MSG}$-SEAL/$K_{MSG}$-SMS is a key derived by ME and MSGIWF/SEAL server/SMSF/from $K_{MSG}$. Optionally, $K_{MSG\text{-}PSK}$ for performing secure association for secure communication over MSGin5G-1.

$K_{MSG}$=KDF {$K_{SEAF}/K_{AMF}$, SUPI/5G-GUTI, ABBA, other possible parameters}

$K_{MSG}$=KDF {$K_{AUSF}$, SUPI/5G-GUTI, ABBA, other possible parameters}

Alternatively, $K_{MSG}$=KDF {EMSK/MSK, SUPI/5G-GUTI, ABBA, other possible parameters}

$K_{MSG\text{-}IWF}/K_{MSG}$-SEAL/$K_{MSG}$-SMS=KDF {$K_{MSG}$, MSGin5G service ID/Gateway service ID, Security Domain URI, other possible parameters}

In an embodiment, for non-3GPP UEs the $K_{MSG}$ is derived from $K_{N3IWF}$ by 5GMSGS client and MSGin5G server when performing secure association for secure communication over MSGin5G-1.

In an embodiment, the $K_{MSG\text{-}PSK}$ key is derived from $K_{MSG}$ by 5GMSGS client and MSGin5G server when performing secure association for secure communication over MSGin5G-1.

$K_{MSG\text{-}PSK}$=KDF $\{K_{MSG}$, other possible parameters<client ID, server ID, application ID>$\}$ Or $K_{MSG\text{-}PSK}$=KDF $\{K_{MSG\text{-}IWF}/K_{MSG}\text{-}SEAL/K_{MSG}\text{-}SMS,$ other possible parameters <client ID, server ID, application ID>$\}$ In another embodiment as per FIG. 18 the PSK is derived from a shared secret, which is a randomly generated SEED KEY.

$K_{MSG\text{-}PSK}$=KDF $\{SEED$ KEY, other possible parameters<client ID, server ID, application ID>$\}$ The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein may be practiced with modification within the spirit and scope of the embodiments as described herein.

The invention claimed is:

1. A method performed by a massive internet of things (MIOT) over 5G (MSGin5G) interworking function entity supporting authentication and authorization between a MSGin5G server and a MSGin5G client, in a wireless network system, the method comprising:

receiving from one of a service enabler architecture layer (SEAL) server or the MSGin5G server, a pre-shared key request;

deriving a first pre-shared key ($K_{MSG\text{-}PSK}$) from a MSGin5G service key ($K_{MSG}$) in response to the pre-shared key request; and transmitting, to one of the SEAL server or the MSGin5G server, the first $K_{MSG\text{-}PSK}$, wherein based on an initial service provisioning procedure with the SEAL server or the MSGin5G server, a second $K_{MSG\text{-}PSK}$ is derived by the MSGin5G client, and wherein the first $K_{MSG\text{-}PSK}$ derived by the MSGin5G interworking function entity and the second $K_{MSG\text{-}PSK}$ derived by the MSGin5G client are used to establish a secure session between the MSGin5G client and the SEAL server.

2. The method of claim 1, wherein deriving of the first $K_{MSG\text{-}PSK}$ from the $K_{MSG}$ in response to the pre-shared key request comprises:

fetching the $K_{MSG}$ from an authentication server function (AUSF) entity, and wherein the $K_{MSG}$ is derived from an AUSF key ($K_{AUSF}$) by a user equipment (UE) and the AUSF entity.

3. The method of claim 1, in case that the secure session is established, further comprising:

validating an access token included in an application registration request by the MSGin5G client.

4. A massive internet of things (MIOT) over 5G (MSGin5G) interworking function entity supporting authentication and authorization between a MSGin5G server and a MSGin5G client, in a wireless network system, the MSGin5G interworking function entity comprising:

a processor coupled with a memory, wherein the processor is configured to:

receive, from one of a service enabler architecture layer (SEAL) server or the MSGin5G server, a pre-shared key request, derive a first pre-shared key ($K_{MSG\text{-}PSK}$) from a MSGin5G service key ($K_{MSG}$) in response to the pre-shared key request, and transmit to one of the SEAL server or the MSGin5G server, the first $K_{MSG\text{-}PSK}$, wherein a second $K_{MSG\text{-}PSK}$ is derived by the MSGin5G client, based on an initial service provisioning procedure with the SEAL server or the MSGin5G server, and wherein the first $K_{MSG\text{-}PSK}$ derived by the MSGin5G interworking function entity and the second $K_{MSG\text{-}PSK}$ derived by the MSGin5G client are used to establish a secure session between the MSGin5G client and the SEAL server.

5. The MSGin5G interworking function entity of claim 4, wherein the processor is further configured to:

fetch the $K_{MSG}$ from an authentication server function (AUSF) entity, and wherein the $K_{MSG}$ is derived from an AUSF key ($K_{AUSF}$) by a user equipment (UE) and the AUSF entity.

6. The MSGin5G interworking function entity of claim 4, in case that the secure session is established, the processor is further configured to:

validate an access token included in an application registration request by the MSGin5G client.

7. A user equipment (UE) supporting authentication and authorization between a massive internet of things (MIoT) over 5G (MSGin5G) server and a MSGin5G client, in a wireless network system, the UE comprising:

a transceiver; and a processor coupled with the transceiver, wherein the processor is configured to:

perform an authentication with a core network using subscription credentials, derive a MSGin5G service key ($K_{MSG}$) using an authentication server function key ($K_{AUSF}$) latest obtained from the authentication, derive a first pre-shared key ($K_{MSG\text{-}PSK}$) either before or after service provisioning procedure with one of a service enabler architecture Layer-layer (SEAL) server or the MSGin5G server, and establish a secure session between the MSGin5G client and the SEAL server using a second $K_{MSG\text{-}PSK}$ derived by a MSGin5G interworking function entity and the first $K_{MSG\text{-}PSK}$ derived by the MSGin5G client.

8. The UE of claim 7, wherein the processor is further configured to:

receive, from one of the SEAL server or the MSGin5G server, an initial service provisioning response, and derive the first $K_{MSG\text{-}PSK}$ in response to the initial service provisioning response received from one of the SEAL server or the MSGin5G server.

9. The UE of claim 8, wherein the processor is further configured to:

transmit, to the SEAL server, an application token request in response to the request from the MSGin5G client, and receive, from the SEAL server, an access token.

10. The UE of claim 8, wherein the processor is further configured to:

transmit, to the MSGin5G server, an application registration request, wherein the application registration request comprises a MSGin5G service ID and an access token, and receive, from the MSGin5G server, an application response upon successful validation of the MSGin5G service ID and the access token, wherein the access token is validated by the MSGin5G interworking function entity, and wherein the MSGin5G service ID is validated by the MSGin5G server.

11. A method performed by a user equipment (UE) supporting authentication and authorization between a massive internet of things (MIOT) over 5G (MSGin5G) server and a MSGin5G client, in a wireless network system, the method comprising:

performing an authentication with a core network using subscription credentials;

deriving a MSGin5G service key ($K_{MSG}$) using an authentication server function key ($K_{AUSF}$) latest obtained from the authentication;

deriving a first pre-shared key ($K_{MSG-PSK}$) based on an initial service provisioning procedure with one of a service enabler architecture layer (SEAL) server or the MSGin5G server; and establishing a secure session between the MSGin5G client and the SEAL server using a second $K_{MSG-PSK}$ derived by a MSGin5G interworking function entity and the first $K_{MSG-PSK}$ derived by the MSGin5G client.

12. The method of claim 11, wherein the deriving, of the first $K_{MSG-PSK}$ comprises:

receiving, from one of the SEAL server or the MSGin5G server an initial service provisioning response; and deriving the first $K_{MSG-PSK}$ in response to the initial service provisioning response received from one of the SEAL server or the MSGin5G server.

13. The method of claim 11, further comprising:

transmitting, to the SEAL server, an application token request in response to the request from the MSGin5G client; and receiving, from the SEAL server, an access token.

14. The method of claim 11, in case that the secure session is established, further comprising:

transmitting, to the MSGin5G server, an application registration request, wherein the application registration request comprises a MSGin5G service identification (ID) and an access token; and receiving, from the MSGin5G server, an application response upon successful validation of the MSGin5G service ID and the access token, wherein the access token is validated by the MSGin5G interworking function entity, and wherein the MSGin5G service ID is validated by the MSGin5G server.

* * * * *